(12) United States Patent
Takekawa

(10) Patent No.: US 7,768,240 B2
(45) Date of Patent: Aug. 3, 2010

(54) POWER GENERATOR

(75) Inventor: Toshio Takekawa, 20-6, Kitayama 2-Chome, Moriyama-Ku, Nagoya-Shi, Aichi-Prefecture (JP) 463-0017

(73) Assignees: Toshio Takekawa, Nagoya-Shi (JP); Harumitsu Higuchi, Mitaka-Shi (JP); Kazumi Kusaba, Higashikurume-Shi (JP)

( * ) Notice: Subject to any disclaimer, the term of this patent is extended or adjusted under 35 U.S.C. 154(b) by 552 days.

(21) Appl. No.: 11/720,890

(22) PCT Filed: Dec. 8, 2005

(86) PCT No.: PCT/JP2005/022582
§ 371 (c)(1),
(2), (4) Date: Jun. 5, 2007

(87) PCT Pub. No.: WO2006/062170
PCT Pub. Date: Jun. 15, 2006

(65) Prior Publication Data
US 2009/0102328 A1 Apr. 23, 2009

(30) Foreign Application Priority Data
Dec. 9, 2004 (JP) ............................. 2004-357244
Dec. 6, 2005 (JP) ............................. 2005-352380

(51) Int. Cl.
*H20P 9/00* (2006.01)
(52) U.S. Cl. .................................. 322/28; 322/46
(58) Field of Classification Search .................. 322/24, 322/28, 45, 46, 51, 52, 62; 290/38 R, 31, 290/40 C
See application file for complete search history.

(56) References Cited

U.S. PATENT DOCUMENTS 5,719,486 A * 2/1998 Taniguchi et al. ............. 322/28
6,437,996 B1 * 8/2002 Wobben ....................... 363/37

FOREIGN PATENT DOCUMENTS

| EP | 0 762 617 | 3/1997 |
| JP | 05-146125 A1 | 6/1993 |
| JP | 05-308751 A1 | 11/1993 |
| JP | 11-215832 A1 | 8/1999 |
| JP | 2001-095220 A1 | 4/2001 |
| JP | 2002-262531 A1 | 9/2002 |
| JP | 2004-248391 A1 | 9/2004 |
| WO | 00/69047 | 11/2000 |

* cited by examiner

*Primary Examiner*—J Gon
*Assistant Examiner*—Iraj A Mohandesi
(74) *Attorney, Agent, or Firm*—Burr & Brown

(57) ABSTRACT

A power generator includes a magnetic pole rotor in which a plurality of N magnetic pole cores and S magnetic pole cores are arranged alternately at regular intervals and that is rotatably supported, stator coils that oppose the magnetic pole rotor and are wound round pole portions of poles of stator poles so as to generate AC power, full-wave rectifying circuits 18 for respective stator coils, and smoothing circuits that are connected to the output sides of the respective full-wave rectifying circuits. The power generator is so structured as to convert multiphase AC generated electric power into DC electric power. Further, line ends of positive (+) poles at the output side of the smoothing circuits are connected to the input side of rectifiers that make only current in the forward direction pass through, and the output side (+) line ends of the rectifiers are connected to a (+) combination line.

3 Claims, 24 Drawing Sheets

POWER GENERATOR

BACKGROUND OF THE INVENTION

1. Field of the Invention

The present invention relates to a power generator that performs a power generation to take out electric currents of a rough multiple of the number of phases.

2. Description of the Related Art

In the prior art, a power generator that generates a multiphase AC conversion type DC electric power (hereinafter, referred to simply as "conventional generator") generates AC electro motive force by stator poles that are arranged independently so as to be at interphase electric angles (electric angle 360°/the number of phases) at regular intervals, or stator coils of the respective poles, sequentially in respective phases. AC waveforms of the respective phases are full-wave rectified by a so-called bridge multiphase or single phase full-wave rectifying circuit (hereinafter, referred to simply as "full-wave rectifying circuit) and the like. And, "pulse flow DC" that forms single phase full-wave rectifying waveforms (where two peak waveforms are formed at electric angle) 360° of the respective phases becomes twilled and forms a multiphase mountain range waveform, and is collected to a load circuit (assembly circuit). The multiphase mountain range waveform shows "incomplete DC". And, the "incomplete DC" is smoothed into "nearly complete DC" by a smoothing capacitor arranged between the output end of the full-wave rectifying circuit and the load circuit.

For example, a tandem 3-phase AC power generator of tandem rotor mechanism described in Patent Document 1 has two systems and thereby generates power, and accordingly, it is structured of two sets of the above electric circuits. The power waveform of each phase of each system is full-wave rectified by a bridge 3-phase full-wave rectifying circuit, and becomes a twilled mountain range waveform "incomplete DC" with six peaks at regular intervals in electric angle 360°. Thereafter, this mountain range waveform "incomplete DC" is made into "nearly complete DC" by a smoothing capacitor arranged per each system.

Further, a DC power generator described in Patent Document 2 is structured to have 12 pieces (12 poles) of respectively independent stators (poles). And, voltage composite waveform rectified by the full-wave rectifying circuit becomes, as shown in FIG. 26, twilled 12-phase mountain range waveform having small peak (m1) of 12 pieces (two pieces per one phase) in electric angle 360° (Pr) at the peak portion. This 12-phase mountain range waveform "incomplete DC" is made into "nearly complete DC" by a smoothing capacitor arranged in the load circuit.

Furthermore, the rectified waveform (voltage waveform) of a DC power generator described in Patent Document 3, as shown in FIG. 27, becomes 7-phase mountain range waveform (m2 width small peak×14 peaks) of seven poles in Pr. This 7-phase mountain range waveform "incomplete DC" becomes "nearly complete DC" by a smoothing capacitor.

Moreover, in the rectifying circuit of a distributed power source power generator described in Patent Document 4, the positive line end of upper capacitor arranged in each phase is collectively connected to the positive output terminal via positive combination line. Accordingly, electric power generated in each phase gives influence upon not merely its own upper capacitor but also upper capacitors of other phases. Therefore, since upper capacitors of all the phases work at the same time, the operation is similar to smoothing operation of a smoothing capacitor arranged in the load circuit (output combination line) shown in the Patent Documents 2 and 3.

That is, in this case too, "incomplete DC" becomes "nearly complete DC" by the roughly same operation as one smoothing capacitor. Meanwhile, the purpose of the present Document 5 is to reduce loss due to voltage drop at low output.

Herein, with regard to the "incomplete DC", the occurrence and the conversion to "nearly complete DC" are explained with reference to an example circuit in FIG. 28. This example circuit converts generated 3-phase AC into DC in the same manner as the conventional machine of the same kind. That is, when electromotive force of each phase of 3-phase AC is rectified by a bridge 3-phase full-wave rectifying circuit, the output waveform of each phase becomes a single phase full-wave rectified waveform (voltage waveform with two peaks in electric angle 360° (Pr)). The single phase full-wave rectified waveform is displaced sequentially with electric angle of electric angle 360° (Pr)÷(3 phases×2 peaks) and becomes twilled 3-phase mountain range waveform (6-peak waveform in Pr). At this stage, 3-phase mountain range waveform "incomplete DC" is made. In small peak m3 between small valleys in each peak top of the 3-phase mountain range waveform, output current flows to load circuit per each peak. Accordingly, the output current generation amount per one phase becomes small current per peak. The "incomplete current" in this state is sent to smoothing capacitor and becomes "nearly complete DC". The take-out DC generation amount per one phase at this moment becomes small current (2 pieces of m3 in Pr) of roughly "100/the number of phases" % to the total DC generation amount of all the phases. Accordingly, in this example circuit, even if the number of phases is increased or decreased, the upper limit of DC generation amount of all the phases does not change but remains roughly same, and the increase amount is zero or an extremely small amount.

In the same manner as this example circuit, in the four conventional machines too, each pulse flow waveform of "incomplete DC" generating in each phase sequentially becomes twilled multiphase mountain range waveform and limited in the high place of waveform, that is, the place where voltage of each phase is high (m1~m3), limited current of each phase flows to the output side, and accordingly the DC generation amount of the output side per one phase becomes only roughly "1/the number of phases". That is, when the number of phases is totalized, the change of the DC generation amount to the increase or decrease of the number of phases is extremely small. Accordingly, the total generation amount of output DC currents occurring at this moment becomes roughly constant (saturated) amount where the upper limit is always at a specified limit (saturated) level.

Further, the conventional machines are structured so that the values of [the total setting number of magnetic poles of magnetic rotor X÷ the total setting number of stator core units Y] or, [the total setting number of stator core units Y the total setting number of magnetic poles X] should not become an integer, and all the stator poles are arranged at regular intervals. For example, in the Patent Document 3, seven pieces (seven poles) of respectively independent stators (14 cores) are arranged at regular intervals angle (51.43 degrees) of regular division of 360°. By the total 16 poles of magnetic poles of magnetic pole rotors, 7-phase power generation (14-peak rectified waveform in electric angle 360° (Pr)) is made. Further, in the Patent Document 5, the proportion of the total setting number of field poles of magnetic pole rotors and the total setting number of stator poles (integer multiple of the number of phases) is 2:3. Accordingly, if the number of field poles is 16 poles, the number of stator poles is 24 poles at regularly divided intervals. Thus, the conventional machines performs power generation where respective phases have regularly divided phase intervals (all same displacement interval waveform), and peak value of small peak of each phase is generated at regular intervals. That is, the conventional machines obtain twilled multiphase mountain range waveform with even generation positions of small peaks of respective phases at the stage of "incomplete DC", and thereby suppress the waveform fluctuation width and unify the fluctuation cycles, and easily obtain "nearly complete DC".

Patent Document 1: Japanese Unexamined Patent Application Publication No. H05-308751

Patent Document 2: Japanese Unexamined Patent Application Publication No. 2001-95220

Patent Document 3: Japanese Unexamined Patent Application Publication No. 2002-262531

Patent Document 4: Japanese Unexamined Patent Application Publication No. 2004-248391

Patent Document 5: Japanese Unexamined Patent Application Publication No. H05-146125

However, in these conventional machines of the same kind, even if the proportion of the total setting number of magnetic poles and the total setting numbers of stator poles is adjusted, or the total setting number of phases is increased, it has been not possible to increase the total generation amount of output DC currents over a specified limit level, and accordingly, it has been desired to realize a power generator that can take out more power generation current.

Further, in the conventional machines, since respective phases have regularly divided phase intervals for power generation, it is necessary to make the values of [the total setting number of magnetic poles of magnetic rotor X÷the total setting number of stator core units Y] or, [the total setting number of stator core units Y÷the total setting number of magnetic poles X] an integer, and the free degree in combination of the total setting numbers X, Y is limited, that has been another problem in the prior art.

SUMMARY OF THE INVENTION

In order to solve the above problems, a power generator according to the invention of claim 1 is one including a magnetic pole rotor in which a plurality of N magnetic poles and S magnetic poles that form magnetic poles are arranged alternately at regular intervals onto a rotor shaft that is rotatably supported, a plurality of stator poles that are formed by winding stator coils round stator iron cores, and arranged at specified intervals on the side opposing the magnetic poles of the magnetic pole rotor, rectifying circuits that are arranged to at least one side of stator coils of the respective stator coils, or, stator coils in which AC electro motive force waveforms occur at same phase in the stator poles thereof along with the rotation of the magnetic pole rotor, smoothing circuits that are connected to the output sides of the respective rectifying circuits and are respectively independent, and rectifiers whose input sides are connected to line ends of positive (+) poles in the output sides of the respective smoothing circuits and are respectively independent, wherein a plurality of phases or two phases or more are made one system, and at least one of the system is arranged, and the output side (+) line ends of the rectifiers are collectively connected to a (+) combination line per the system.

While on the other hand, in the electric circuit of the conventional machines of the same kind described in for example the Patent Documents 1 to 3, in all of the three, only one smoothing capacitor is arranged in the load circuit (assembly circuit). Further, in the electric circuit according to the embodiment of the Patent Document 4, respectively independent rectifiers (per each phase) are not arranged between the positive side line end and the positive side output terminal of capacitors arranged per phase. Therefore, the electric power generating individually in each phase gives influences upon the upper capacitor of its own phase and the upper capacitors of other phases.

A machine according to the present invention is explained with reference to FIG. 1, and first, the structure thereof is made by independently arranging full-wave rectifying circuits (three pieces), smoothing circuit (three pieces) and rectifiers (silicon diodes or the like) (three pieces) per each stator coil pole portion or per each phase. With regard to the connection, the output side (+) line ends of the rectifiers are collectively connected to a (+) combination line of the load circuit (assembly circuit). By this circuit, AC electro motive force generating at each stator coil pole portion of stators is rectified by full-wave rectifying circuits respectively arranged per each stator coil pole portion, or per each phase, and single-phase full-wave rectified "pulse flow DC" (2-peak waveform in (+) direction in electric angle 360° (Pr)) is generated.

And, this "pulse flow DC" (2-peak waveform in Pr) goes through respectively independently arranged smoothing circuits and becomes "nearly complete DC". The waveforms of voltage and current herein becomes the same hill shape waveform as in FIG. 8. The (+) side of the "nearly complete DC" makes independent rectifiers (silicon diodes and the like) (reverse stop, one-way rectification) pass in one direction (does not give influence to smoothing capacitors of other phases). Respective phase electric powers collecting to the (+) line of the load circuit (assembly circuit) are subject to 3-phase combination and become the same "complete DC" as in FIG. 9, at the same time per each phase, in the same manner as single phase AC, generate roughly 3-phase multiple DC current nearly 100% per one phase, or 100% current taken out.

The calculation equation of the power generation total current (the present invention) becomes as below.

$$I=Ia \times (Sn \div Pn) \times Pn = Ia \times Sn$$

Herein, I shows power generation total current, Ia is AC power generation current per one stator (effective value), Sn is the number of poles of stator, and Pn is the number of phases.

However, the calculation equation of the power generation total current of the conventional machines of the same kind becomes as below.

$$I=Ia \times (Sn \div Pn)$$

In the machine according to the present invention of the structure, multiphase AC of plural phases of two phases or more is converted into "complete DC", and, in the same manner as in taking out current of single phase AC, it is possible to take out nearly 100% of each phase current, or take out 100% thereof. Accordingly, the machine according to the present invention, with regard to the output current, can obtain the power generation total amount more than the specified limit level of the conventional machines. That is, it can take out current of roughly multiple of the number of phases of the maximum power generation current amount per one phase. Accordingly, the more the number of phases is made, the more current it can be take out, and flow current to output load, and by making the number of phase up to set limit, it can generate power of higher efficiency, higher output power than the conventional machines of the same kind.

Further, a power generator according to the invention of claim 2 is one where the stator poles are formed respectively independently to be magnetic insulated, and the magnetic pole interval between same magnetic poles of the magnetic pole rotor is different from the stator pole interval between stator poles opposing the magnetic poles.

Furthermore, a power generator according to the invention of claim 3 is one where the magnetic rotor is formed so that the N magnetic poles and S magnetic poles are arranged alternately in the rotation direction of the rotor shaft, and, a twin magnetic pole portion of a pair of opposing N magnetic pole and S magnetic pole is arranged in the rotor shaft direction in roughly same phrase, and the stator iron core is formed into a roughly U shape cross section so as to protrude a pair of core portions, and one end of the core portion is opposed to one magnetic pole of the twin magnetic portion, and the other end of the core portion is opposed to the other magnetic pole of the twin magnetic pole portion, and a pair of core portions are arranged so as to be along the axial direction of the rotor shaft.

Moreover, a power generator according to the invention of claim 4 is one where the magnetic rotor is formed so that the N magnetic poles and S magnetic poles are arranged alternately in the rotation direction of the rotor shaft, and the stator iron core is formed into a roughly U shape cross section so as to protrude a pair of core portions, and both the ends of the core portion is opposed to magnetic poles of the magnetic pole rotor, and a pair of core portions are arranged so as to be along the rotational direction of the rotor shaft.

Still further, a power generator according to the invention of claim 5 is one where the relation between the pitch angle θn at the attachment positions of the total setting number of stator poles Sn and the total setting number X of magnetic poles of the magnetic pole rotor becomes as below, $$\theta n=\{360°-(360°\div X)\}\div Sn$$

and, the interval angle between the stator poles is made so as to become wide at one position.

Meanwhile, in order to carry out multiphase power generation by the conventional machines of the same kind, it is necessary to set a number so that the value of [the total setting number of magnetic poles of magnetic rotor X÷the total setting number of stator core units Y] should not become an integer. While on the other hand, in the power generator according to the invention of claim 5 is so structured to be able to perform multiphase power generation even if the value becomes an integer, or, it becomes a value that does not become an integer. Accordingly, it is possible to increase the free degree of combination of the total setting numbers. And the total setting number Sn of stator poles absolutely becomes same as the total setting number of phases. Further, the attachment position pitch angle θn of stator poles absolutely becomes an angle different from the pitch angle (in Pr) between N poles of the magnetic pole rotor. Accordingly, multiphase power generation is available with any total setting number Sn of stator poles, and it is possible to perform further higher efficiency and further higher output power generation.

According to the invention of claim 1, at output load current 100% in output rated voltage, it is possible to take out current of nearly 100% per one phase, or 100%, and it is possible to take out current of roughly multiple of the number of phases of the maximum power generation current amount per one phase, accordingly, by making the number of phase up to set limit of stator poles, it is possible to perform a power generation of higher efficiency and higher output.

According to the invention of claims 2, 3, 4, it is possible to balance in total and make close to zero the plus torque and the minus torque working in the rotational direction of the magnetic pole rotor arising from reaction effect or absorption effect of exciting magnetic force of the magnetic pole rotor and the field magnetic force of the stator iron core between the respective magnetic pole portions and the stator iron core. Further, the exciting magnetic force of the magnetic pole rotor gives absorption force to the stator iron core, even when there is no magnetic field in the stator iron core, but with regard to this absorption force, the effect to pull in the rotational direction of rotor, and the effect to pull in the reverse direction of the rotational direction are antagonisticly balanced in total and the rotation load torque of the rotor is reduced. Therefore, the influence by the absorption force to power loss is extremely small in any phase of the rotor. Accordingly, it is possible to increase the conversion efficiency from mechanical power energy to electric energy.

According to the invention of claim 5, to the magnetic pole rotor having any total setting number of magnetic poles (an even number is acceptable too), even with any total setting number Sn of stator poles, it is possible to perform multiphase power generation of high output, increase the combination free degree of the total setting numbers, and perform a power generation of higher efficiency and higher output.

Figure 1:
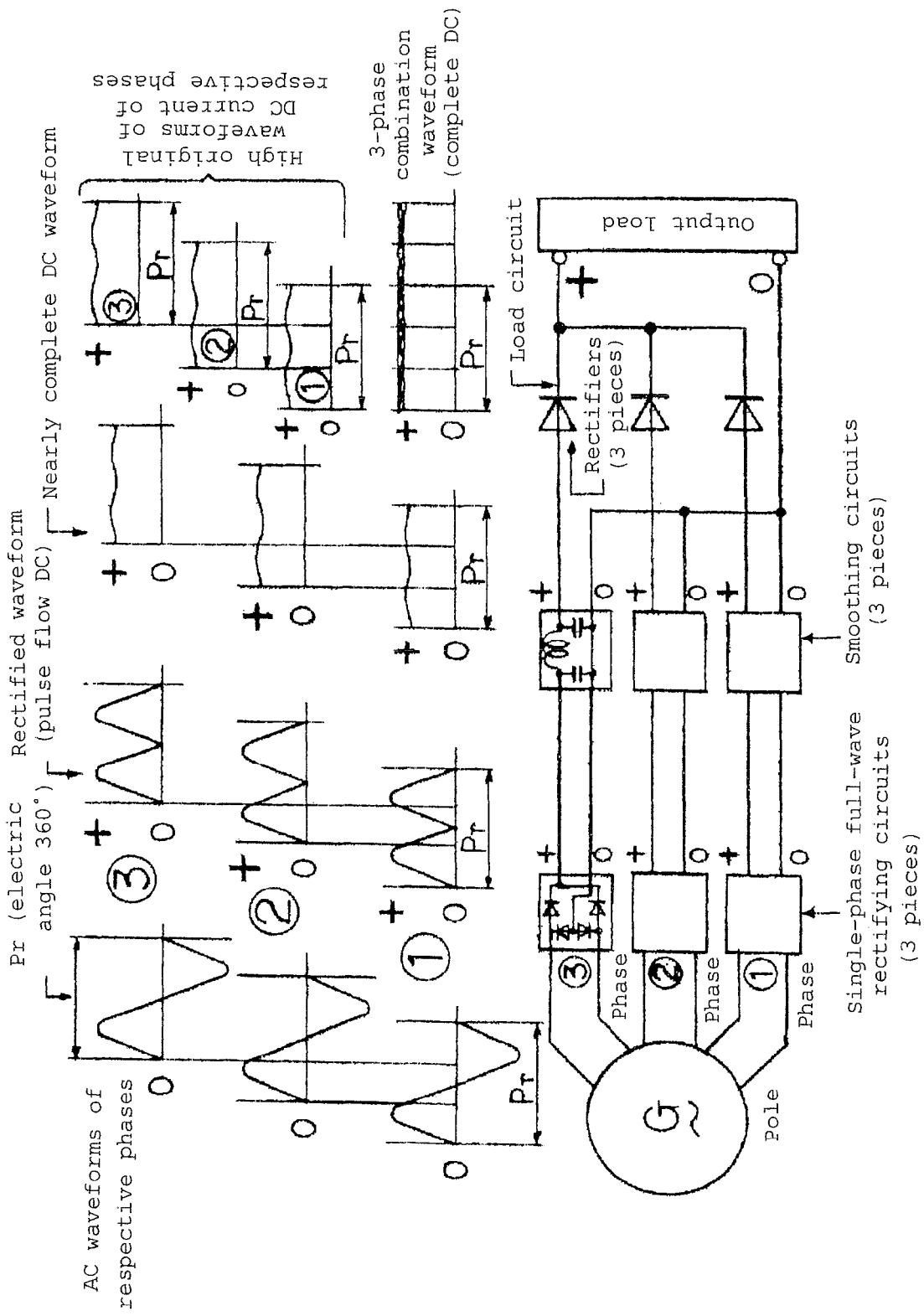
FIG. 1 is an explanatory figure showing a basic circuit structure of a power generator according to the present invention and waveforms at respective portions.

DESCRIPTION OF CODES 1, 50, 100, 201, 301, 350, 400 Power generator
2 Casing
3, 4 End frame
5, 6 Bearing portion
7, 207a, 207b, 307 Magnetic pole rotor
8 N magnetic pole
8a N magnetic flux transmission portion
8b, 314b N pole core
9 S magnetic pole
9a N magnetic flux transmission portion
9b, 314a S pole core
10 Joint ring
11 Rotor shaft
11a Shaft jaw
12 Exciting magnetic iron core shaft
12a Left jaw portion
12b Right jaw portion
12c Ring shaped slot portion
12d Electric line hole
13 Exciting magnetic coil
13a, 13b Coil end
14 DC power source controller
15 Stator iron core
15a, 15b Core portion
16 Stator coil
16a, 16b Stator coil both line end
17 Stator pole
18 Single-phase full-wave rectifying circuit
18a, 18b Input side terminal
18c Output side (+) line end
18e Rectifier
18d (O) line end
49 Smoothing circuit
49a Input side (+) terminal
49b (O) terminal
49c Output side (+) line end
49d (O) line end
49e, 49f Smoothing capacitor
49g Coil
40 Rectifier
40a Output side (+) line end
41, 121, 221 Load circuit
45a (+) combination line
45b (O) combination line
42 Phase circuit
43, 123, 223 Power output portion
43a, 123a, 223a (+) output portion terminal
43b, 123b, 223b (O) output portion terminal
24a, 24b Switch
215a, 215b, 215c, 215d Pole core
Pp Magnetic pole width
Pr N magnetic pole pitch interval (electric angle 360°)
Ps Core interval
Pt Stator pole interval
Sn Total setting number of stator poles
W1 Iron core width
W2 Iron core width
X Total setting number of magnetic poles
Y Total setting number of core portions
θn Pitch angle

DETAILED DESCRIPTION OF THE INVENTION

Figure 2:
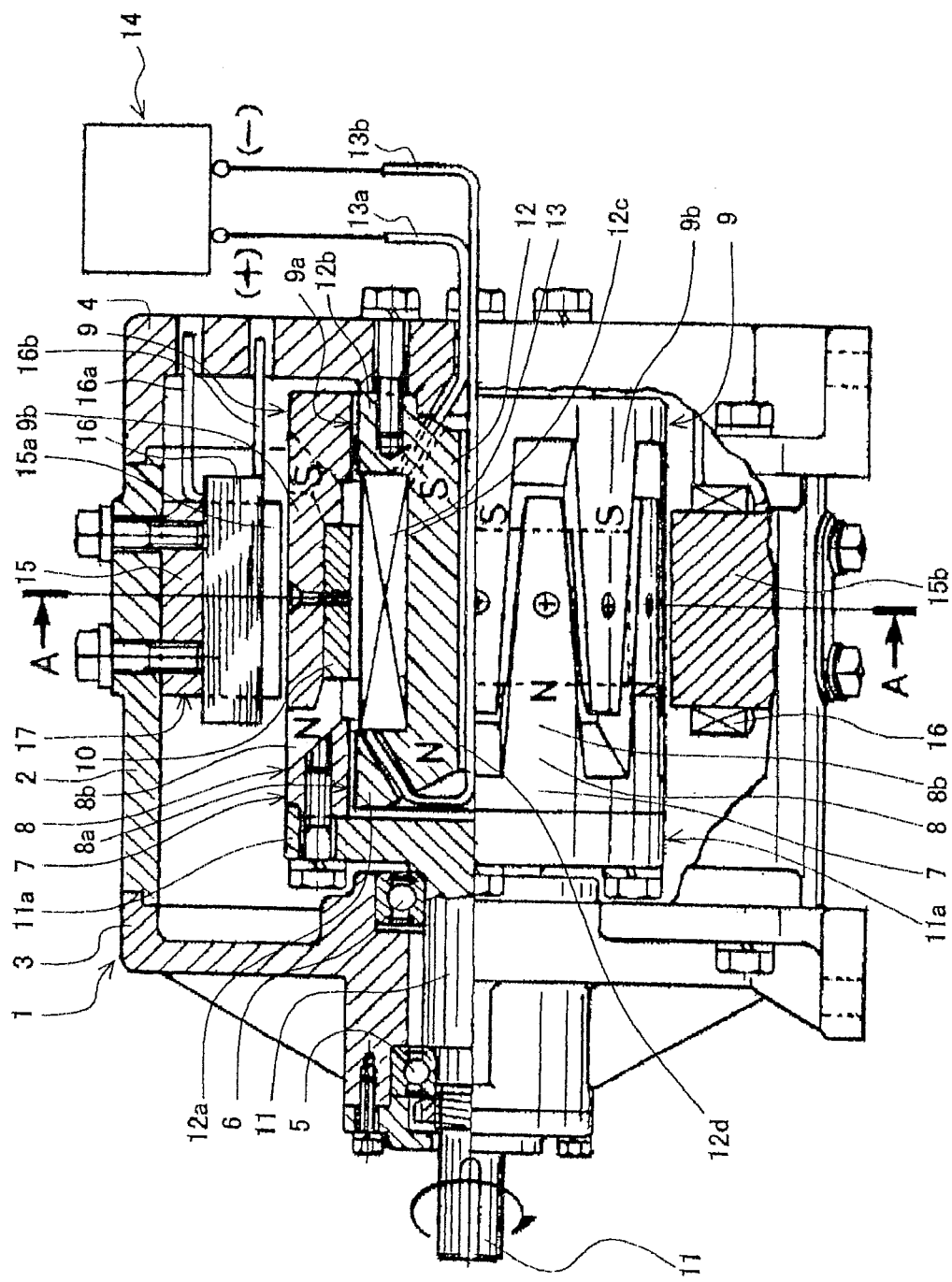
FIG. 2 is a cross sectional front view of a substantial part showing a first embodiment of a power generator according to the present invention.
Figure 3:
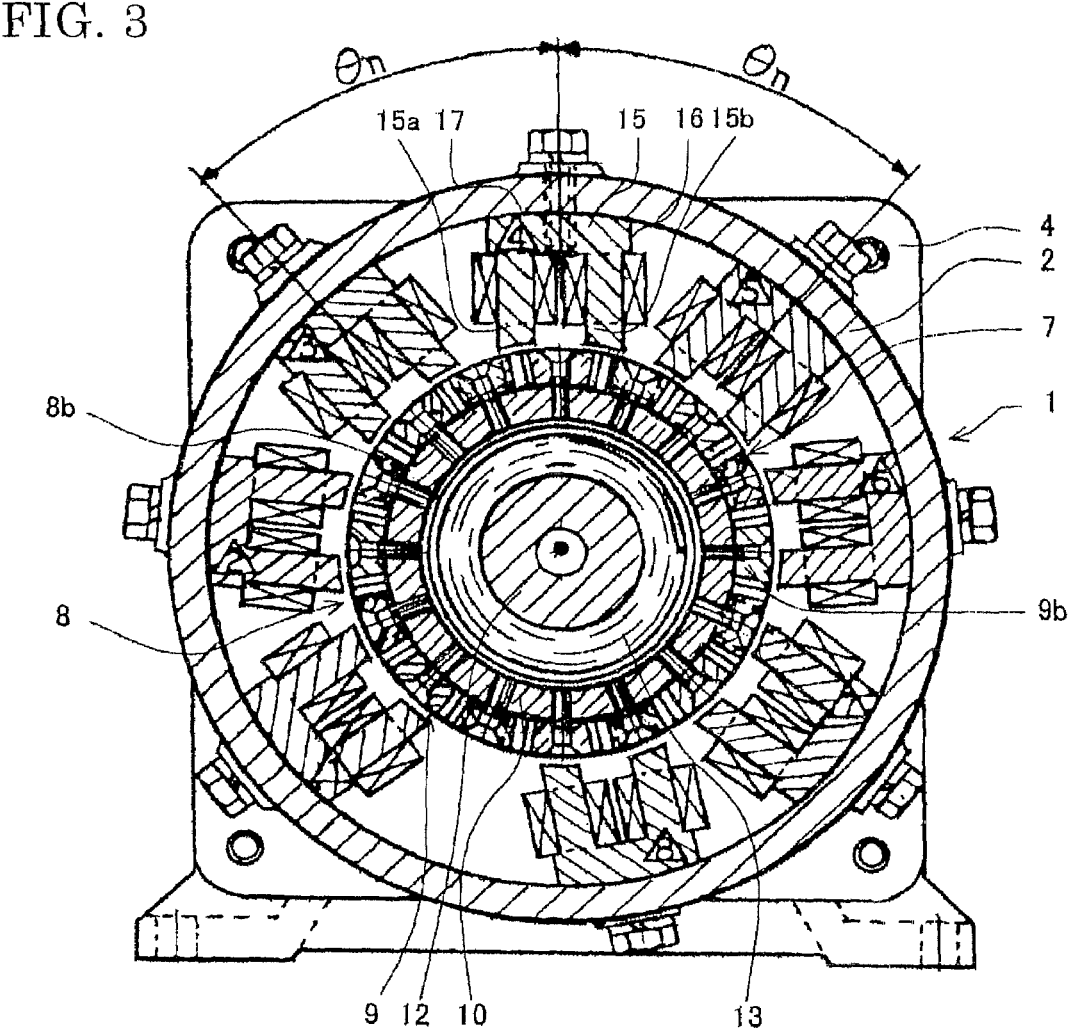
FIG. 3 is a cross sectional view at A-A line of the power generator in FIG. 2.
Figure 4:
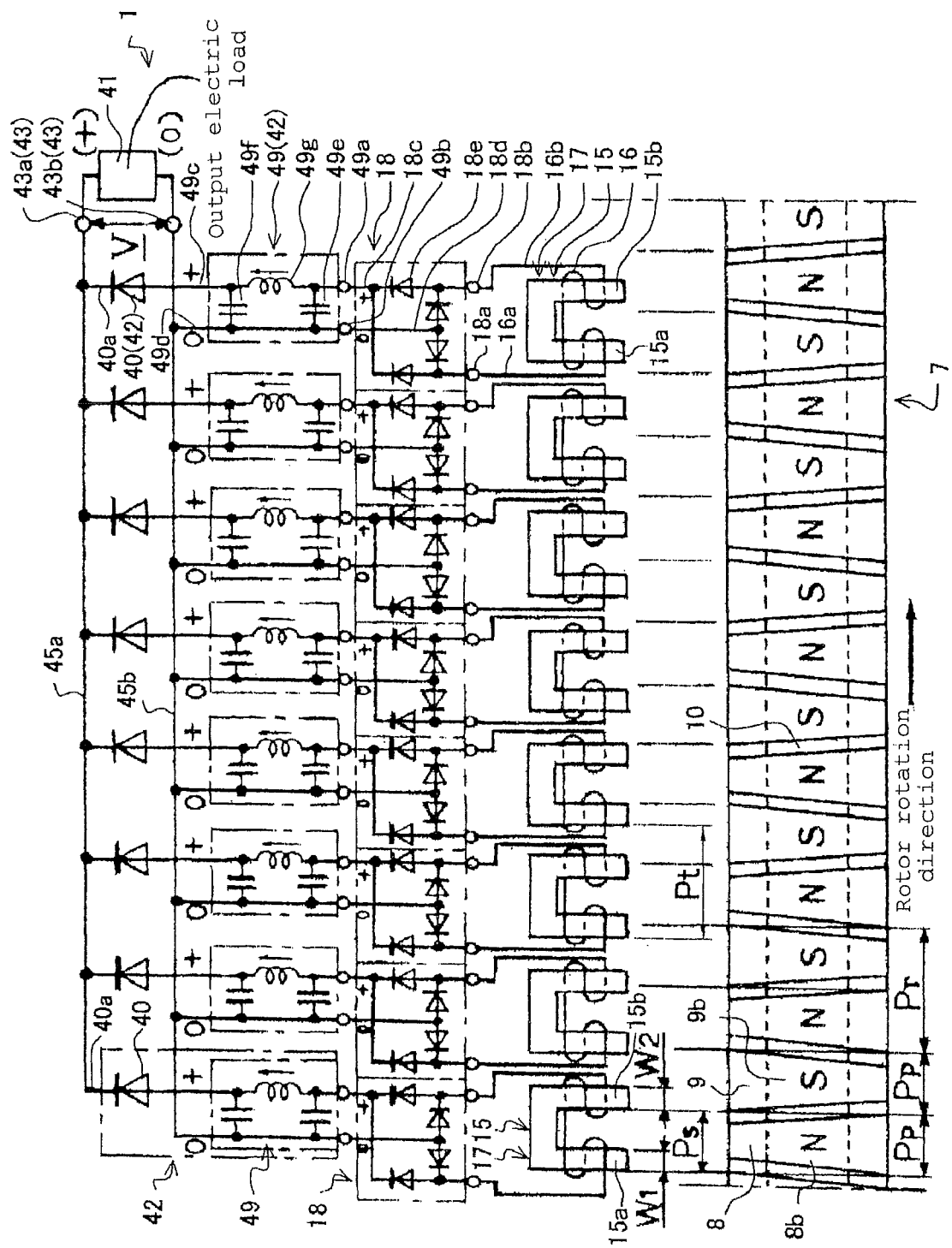
FIG. 4 is a schematic diagram for explaining the power generation principle of the power generator in FIG. 2.

Embodiment according to the present invention are illustrated in more details with reference to the attached drawings hereinafter. FIG. 2 is a cross sectional front view of a substantial part showing a first embodiment of a power generator according to the present invention. FIG. 3 is a cross sectional view at A-A line of the power generator in FIG. 2. FIG. 4 is a schematic diagram for explaining the power generation principle of the power generator in FIG. 2.

Reference number 1 denotes a power generator according to the present invention, 2 denotes a nonmagnetic casing made of aluminum or the like, 3 and 4 denotes nonmagnetic left and right end frames, and 5, 6 denote bearing portions. Magnetic pole rotor 7 is structured so that eight cylindrical N pole cores 8b having N magnetic flux transmission portions 8a of N magnetic pole 8 to transmit field main magnetic flux, and eight cylindrical S pole cores 9b having N magnetic flux transmission portions 9a of S magnetic pole 9 oppose mutually and engage mutually in the axial direction, and 16 pieces in total of N pole cores 8b and S pole cores 9b are arranged alternately at regular magnetic pole intervals. And the magnetic pole rotor 7 is formed into a cylindrical rotor shape by combining the N pole cores 8b and the S pole cores 9b with a nonmagnetic metal joint ring 10. Further, one end (left side) of the N magnetic pole 8 is integrally jointed to of shaft jaw 11a of rotor shaft 11 made of nonmagnetic metal with a bolt so that the magnetic rotor 7 can rotate.

In the cylinder inside of the magnetic pole rotor 7, exciting magnetic iron core shaft 12 on whose shaft center an electric line hole 12d is opened is arranged. The magnetic pole rotor 7 is formed rotatably with the gap between the axial left jaw portion 12a of the exciting magnetic iron core shaft 12 and the inner circumferential surface of the N pole core 8b slightly opened, and, with the gap between the axial right jaw portion 12b of the exciting magnetic iron core shaft 12 and the inner circumferential surface of the S pole core 9b slightly opened. And, exciting coil 13 is wound round ring shaped slot portion 12c at the center of the exciting magnetic iron core shaft 12, and coil ends 13a, 13b of the coil are connected to (+), (−) terminals of DC power source controller 14.

At magnetic pole outer circumferential opposing side of N magnetic pole 8 and S magnetic pole 9 of the magnetic pole rotor 7, along the rotational direction of the magnetic pole rotor 7, eight stator poles 17 are arranged at regular intervals. Each stator pole 17 is formed by winding stator coil 16 round stator iron core 15. The stator iron core 15 is formed into a roughly U shape cross section so as to protrude a pair of core portions 15a, 15b from both the ends of connection beam. Both the protruded ends of the core portions 15a, 15b with stator coil 16 wounded round are arranged along the rotational direction of the magnetic pole rotor 7. And both the protruded ends of the core portions 15a, 15b are arranged to oppose the outer circumferential surface of N pole core 8b and S pole core 9b with the gap slightly opened so that the magnetic pole rotor 7 can rotate. Each status pole 17 is attached to inner circumferential surface of casing 2 with bolt via stator iron core 15, so as to be magnetic insulated and individually independent.

Further, the attachment pitch (specified interval) angle θn of stator pole 17, to the total setting number X of N magnetic poles 8 and S magnetic poles 9 of the magnetic pole rotor 7, with the total setting number of stator poles 17 as Sn pieces, is calculated by the calculation equation θn={360°−(360°÷X)}÷Sn. Herein, from FIG. 3, X=16 and Sn=8.

Therefore, the pitch angle is calculated as below.

$$\theta n=\{360°-(360°\div16)\}\div8=42.19°$$

However, the pitch angle at one position is wide as 64.67°. Further, in the power generator 1, the relation of the total setting number X of magnetic poles 8, 9 and the total setting number Sn of stator poles 17 becomes so that the value of X/Sn (=16/8) becomes an integer.

As shown in FIG. 4, stator coil both line ends 16a, 16b of each stator coil 16 are connected to input side terminals 18a, 18b of individually independent eight full-wave rectifying circuits 18. Meanwhile, the full-wave rectifying circuits 18 are structured of four rectifiers (silicon diodes and the like) 18e. Output side (+) line end 18c of the full-wave rectifying circuit 18 is connected to input side (+) terminal 49a of individually independent eight smoothing circuits 49 arranged per stator pole 17. Further, (O) line end 18d of the full-wave rectifying circuit 18 is connected to (O) terminal 49b of the smoothing circuit 49.

Output side (+) line end 49c of the smoothing circuit 49 is connected to input side of eight rectifiers (silicon diodes or the like) 40 arranged per stator pole 17. Further, output side (+) line end 40a of the rectifier 40 is collectively (parallel) bound to (+) combination line 45a, and connected via (+) combination line 45a to (+) output portion terminal 43a. And, the (+) output portion terminal 43a is connected to (+) line end of the load circuit 41. On the other hand, (O) line end 49d of the smoothing circuit 49 is collectively bound to (O) combination line 45b, and connected via (O) combination line 45b to (O) output portion terminal 43b. And, the (O) output portion terminal 43b is connected to (O) line end of the load circuit 41. Meanwhile, the smoothing circuit 49 is formed by arranging coil 49g to (+) side of smoothing capacitors 49e, 49f. Further, smoothing circuit 49 and rectifier 40 are combined to become phase circuit 42. The power generator 1 has 8 circuits of this phase circuit 42. Further, (+) output portion terminal 43a and (O) output portion terminal 43b form a pair of electric power output portion 43.

Meanwhile, iron core width W1 of core portion 15a of stator pole 17 is roughly same as iron core width W2 of the other core portion 15b. The core interval of core portion 15a and core portion 15b is roughly same as magnetic pole width Pp of N pole core 8b of magnetic pole rotor 7, or S pole core 9b. Pitch interval Pr between same magnetic poles is electric angle 360°, twice of magnetic pole width Pp. And pitch interval Pr is different from stator pole interval Pt of two stator poles 17 opposing magnetic pole.

Next, functions of the power generator 1 according to the first embodiment are explained hereinafter.

In FIG. 2 and FIG. 3, to exciting coil 13 of exciting magnetic iron core shaft 12, DC is sent and applied from the power source controller 14, and N pole field main magnetic flux is made in the left jaw portion 12a, and S pole is made in the right jaw portion 12b. The N pole field main magnetic flux goes through slight gap from outer circumferential surface of the left jaw portion 12a and transmits to N magnetic flux transmission portion 8a of N magnetic pole 8 of magnetic pole rotor 7, and is transmitted to N pole core 8b. On the other hand, the S pole field magnetic main flux goes through slight gap from outer circumferential surface of the right jaw portion 12b and transmits to S magnetic flux transmission portion 9a of S magnetic pole 9, and is transmitted to S pole core 9b.

Figure 5:
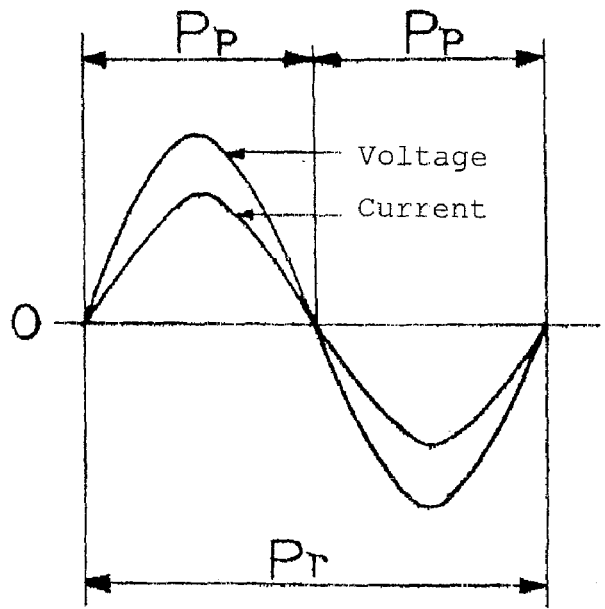
FIG. 5 is an explanatory figure showing generation phases of voltage and current after passing a full-wave rectifying circuit.

When the magnetic pole rotor 7 rotates, the N pole field main magnetic flux of N pole core 8b, to protruded end inner circumferential surface of core portions 15a, 15b of stator pole 17, over gap N field magnetic transmits alternately. The N pole field main magnetic flux received to one of the core portion 15a or 15b sequentially transmits each stator iron core 15, and flows in S magnetic pole side direction of reverse side core portion. At this moment, single phase AC electromotive force occurs sequentially in each stator coil 16. The voltage occurrence phase and current occurrence phase in AC electromotive force at this moment, in the case of the present first embodiment, since the full-wave rectifying circuit 18 is connected directly to coil both ends of stator coil 16, AC electromotive force passes the full-wave rectifying circuit 18 and becomes DC, become power factor 1 (always). Accordingly, as shown in single phase AC waveform of each phase in FIG. 5, voltage becomes same phase as current.

The attachment pitch (interval) angle θn of stator pole 17, as mentioned previously, is calculated by the calculation equation θn={360°−(360°÷X)}÷Sn, and becomes 42.19°. Further, there is a wide interval (angle) 64.67° at one position. By irregular arrangement, even when the total setting number X (16 pieces) of magnetic poles 8, 9 and the total setting number Y (16 pieces) of core portions 15a, 15b of all stator poles 17 are same, or, even when the total setting number of stator poles 17 (number of poles) Sn is any pieces, multiphase AC electromotive force occurs sequentially at each stator pole 17 so that phases are at even divided phase intervals.

Figure 6:
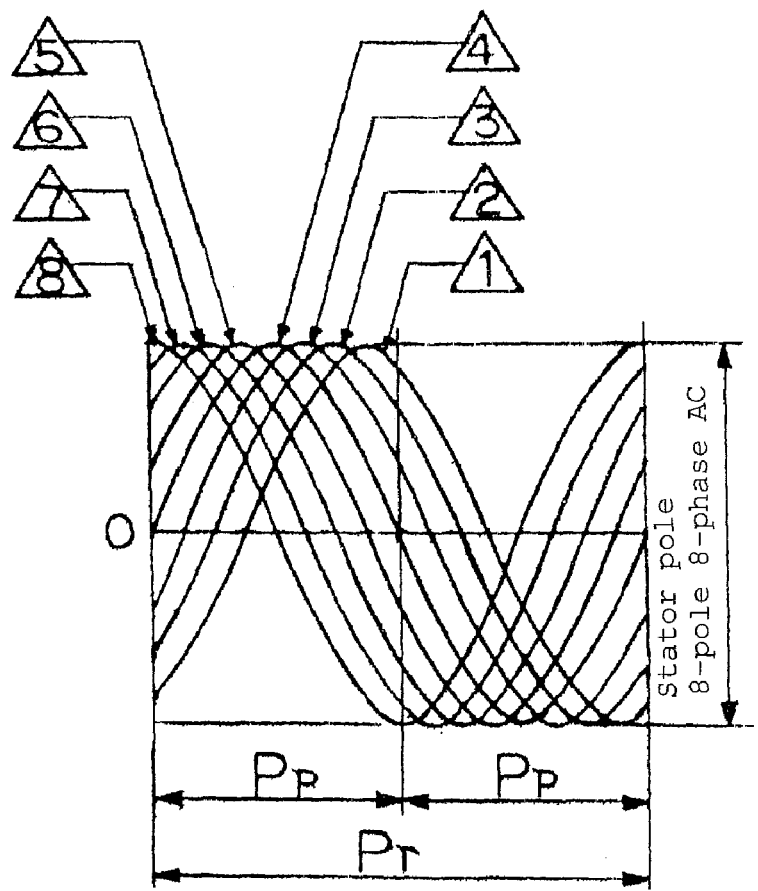
FIG. 6 is an explanatory figure showing respective single phase AC waveforms of AC exciting electric power just after generation in respective stator shafts.

As shown in FIG. 6, when AC waveform (waveform of different phase) of each phase of the 8-pole 8-phase AC electromotive force is arranged in order by one phase in generation order, it becomes 8-phase AC waveform. The voltage, current flow singly per one phase. Current of each phase is 8-phase compounded by electric power output portion 43 (43a, 43b) and becomes "complete DC" and roughly 100% is taken out.

Figure 7:
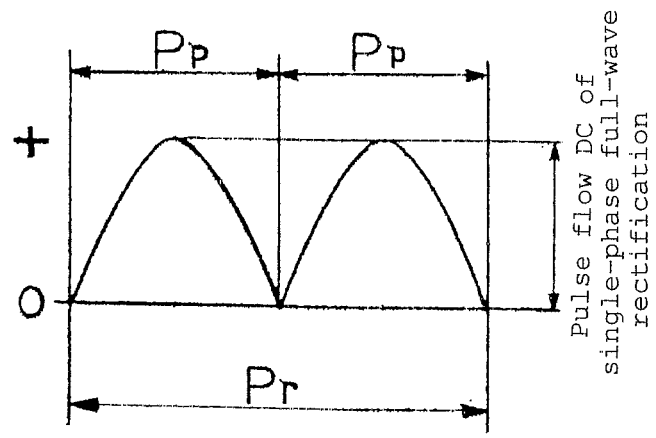
FIG. 7 is an explanatory figure showing pulse flow waveforms of single phase full-wave rectification.

The operation to take out current is explained in details hereinafter. As shown in FIG. 4, each AC electromotive force generated by each stator pole 17 goes from stator coil both line ends 16a, 16b, via input side terminals 18a, 18b of each full-wave rectifying circuit 18 and goes into rectifying circuit 18. Herein each AC electromotive force becomes "pulse flow DC" (incomplete DC) of single phase full-wave rectification that forms pulse flow waveform (2 peaks in Pr) of single phase full-wave rectification like FIG. 7 per each phase.

Figure 8:
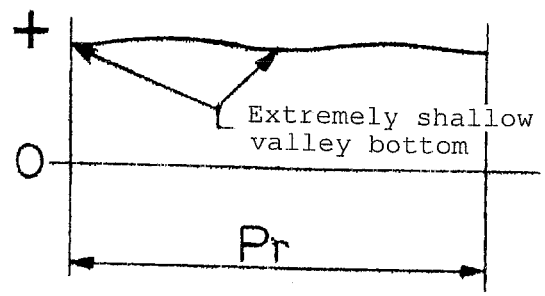
FIG. 8 is an explanatory figure showing a pulse flow waveform smoothed by a smoothing circuit.

And, in full-wave rectifying circuit 18 of each phase, rectified "pulse flow DC" (DC component) goes from output side (+) line end 18c of full-wave rectifying circuit 18 via input side (+) terminal 49a of individually independent smoothing circuit 49 and into smoothing circuit 49. Meanwhile, in smoothing capacitor 49e, "pulse flow DC" input from full-wave rectifying circuit 18 is made into incomplete "rough DC". Coil 49g lets this "rough DC" DC component go. Further by smoothing capacitor 49f, it is further polished, and becomes "nearly complete DC" per each phase as shown in FIG. 8. At this moment too, in per each phase, since it is independent DC and current of nearly 100% per phase, or 100% can be taken out in the same method as a single phase current flow per one phase.

Voltage and current of (+) side of "nearly complete DC" per each phase are present to become full phase, roughly same voltage and roughly same current amount, and flow from output side (+) line end 49c of each smoothing circuit 49 to input side of each rectifier 40, and pass rectifier 40 as stop valve in one direction. And, they flow to (+) combination line 45a connected to (+) line end of load circuit 41. The rectifier 40 lets its own (+) DC of each phase circuit 42 pass, and blocks other (+) DC, and prevent other DC power from running to its own smoothing circuit 49 and from being influenced. By the function of this rectifier 40, "nearly complete (+) DC" of each phase collects via (+) combination line 45a to (+) output portion terminal 43a, combine and become "complete DC". Meanwhile, if there is not rectifier 40 at all, power sequentially generating in each phase gives influence to all other smoothing capacitors 49e, 49f, and as a result, the roughly same situation as conventional machines of the same kind occur, and only current to limit level for one phase can be taken out.

On the other hand, (O) component, when AC occurs in each stator coil 16, goes from (O) combination line 45b connected to (O) line end of load circuit 41 through (O) terminal 49b of each smoothing circuit 49, further goes through full-wave rectifying circuit 18 and works of (O) pole alternately to stator coil line end 16a, or 16b.

Figure 9:
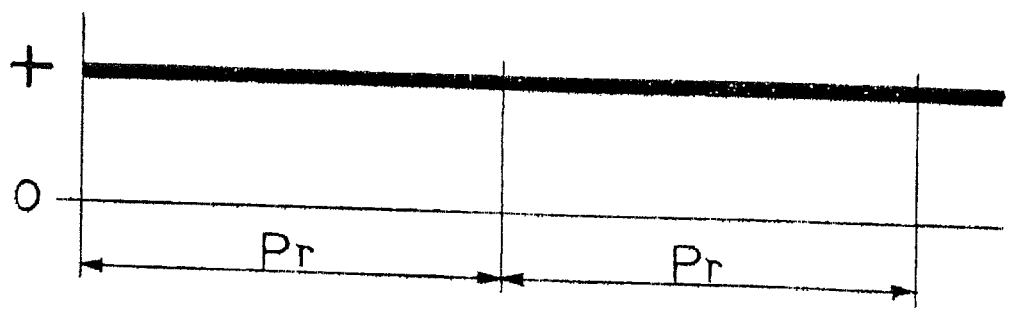
FIG. 9 is an explanatory figure showing a waveform after electric power collection.

Voltage and current of (+) side of "nearly complete DC" of each phase sequentially passes the respective rectifiers 40 with phase difference at regular intervals. And it flows to (+) combination line 45a and collects in (+) output portion terminal 43a, and 8-phase "nearly complete DC" combines. That is, 8-phase combined "complete DC" shown in FIG. 9 is made. Meanwhile, in "nearly complete DC" in each phase, all are roughly same voltage and roughly same current amount.

Figure 10:
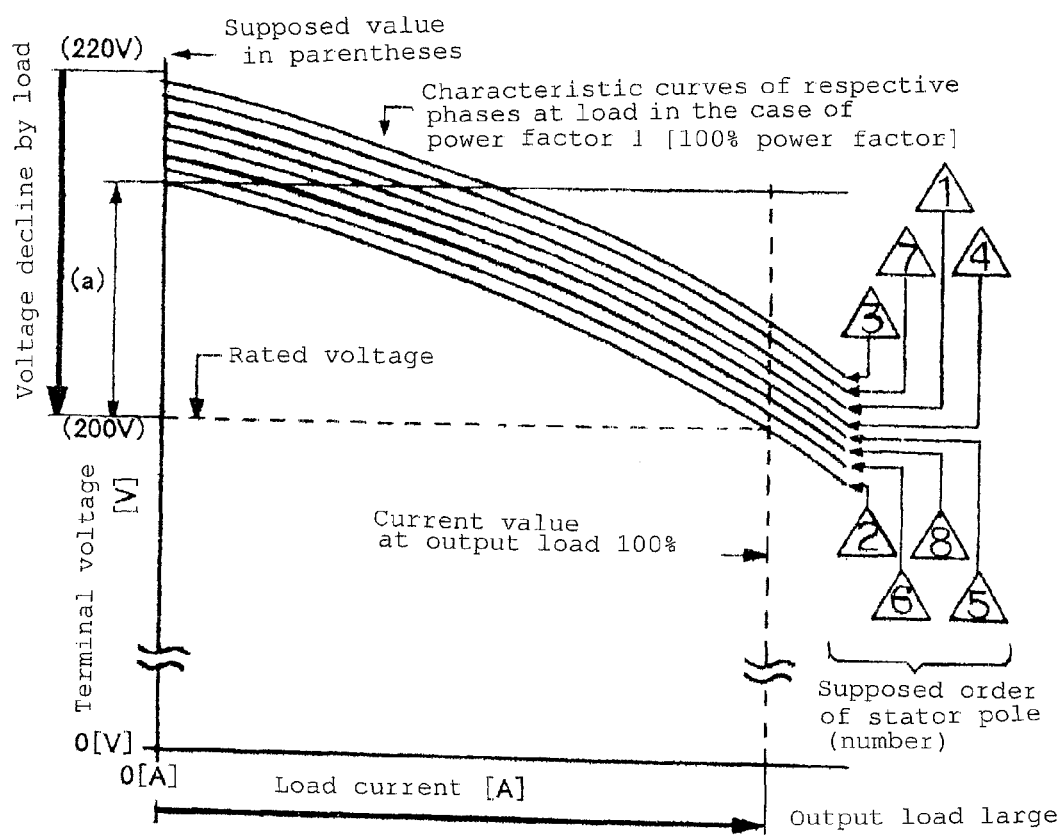
FIG. 10 is an explanatory figure showing characteristic curves of respective phases at load in the case of power factor 1.

Further, as shown in FIG. 8, voltage of eight pieces (eight poles) of stator poles 17 (8-phase) has two portions that are slightly high, and when output load is small, current flows from the phase with higher voltage. And, since non load voltage of power factor 1 or delay power factor is higher than rated voltage at output load 100%, as shown in FIG. 10, as the output load current comes close to 100%, voltage decrease to become close to rated voltage. While it decreases to rated voltage, it is possible to take out current of all phases by roughly 100%.

Even if there is uneven voltage difference of each stator pole 17 in a narrow range as shown in FIG. 10, AC electromotive force of all the stator poles 17 according to the present invention has roughly power factor 1 (roughly 100% power factor), the characteristic curve of each voltage vs. current becomes as shown in FIG. 10, and as the output load current increases from non load voltage, voltage of eight pieces (eight poles) of stator poles 17 (8-phase) becomes close to the rated voltage (output load 100%), further, when it becomes load current 100%, the voltage goes down to the rated voltage.

Accordingly, even if there is uneven voltage difference of each of eight pieces (eight poles) of stator pole 17 as mentioned above, in (a) in FIG. 10, current can be taken out from eight poles (eight phases). And, when the output load current reaches 100%, and voltage becomes the rated voltage, from all the eight pieces (eight poles) of stator poles 17 (8-phase), in the same manner as in single phase AC, it is possible to take out nearly 100%, or 100% of DC current per one phase.

Therefore, as described above, according to the power generator 1 of the first embodiment, it is possible to take out current of roughly multiple of the number of phases of maximum generation current amount per one phase, the more the number of phases is made (up to the set limit), the more current can be taken out, and it is possible to perform a power generation of DC electric power of higher efficiency and higher output. Further, to the magnetic pole rotor 7 having any total setting number of magnetic poles (an even number is acceptable too), even with any total setting number Sn of stator poles 17, it is possible to perform multiphase power generation of higher output, increase the combination free degree of the total setting numbers, and perform a power generation of higher efficiency and higher output.

Figure 11:
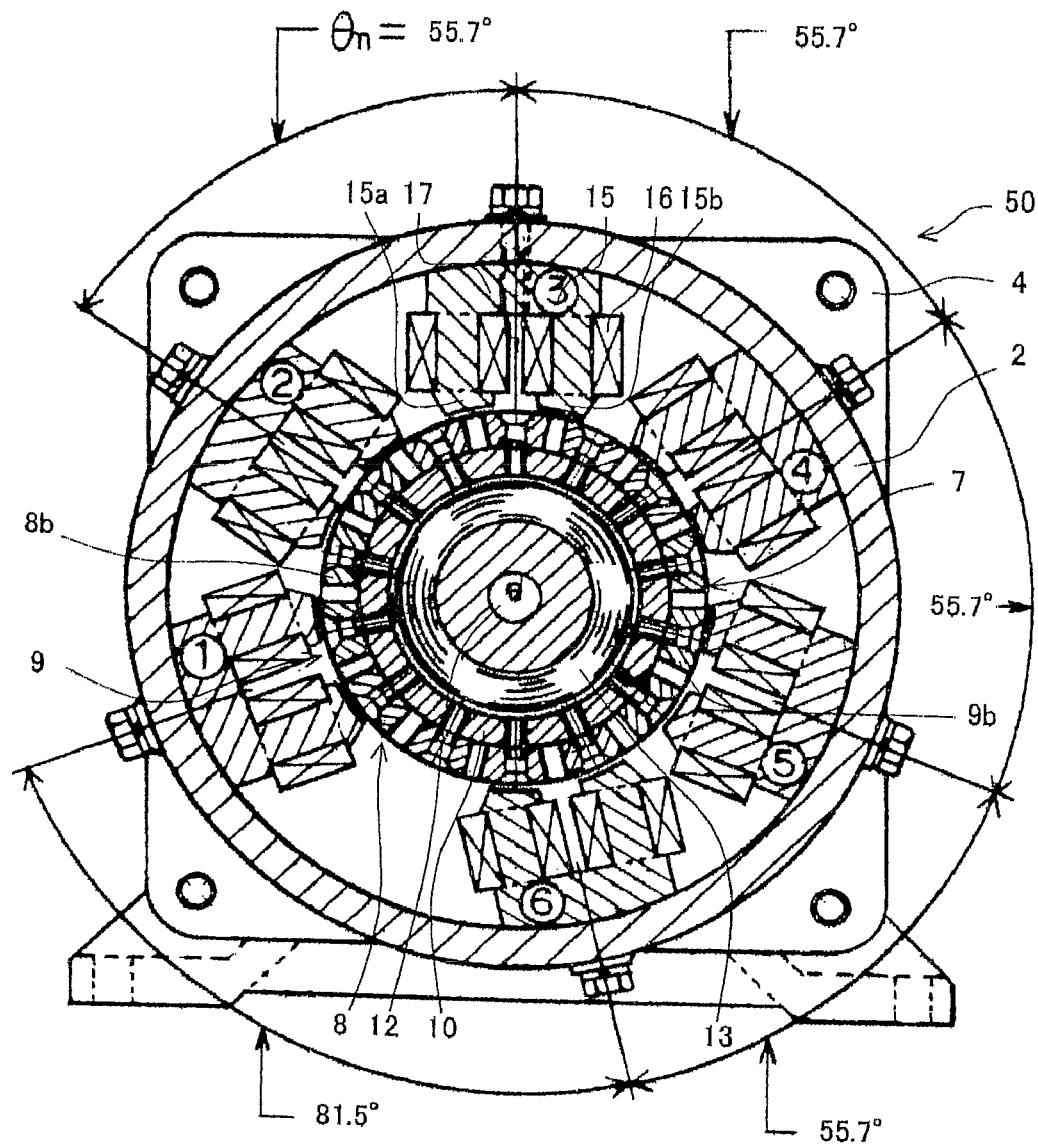
FIG. 11 is a cross sectional view showing a second embodiment according to the present invention.

Next, a second embodiment of a power generator according to the present invention is explained hereinafter. As shown in FIG. 11, in a power generator 50, when the attachment pitch (interval) angle of stator pole 17 is calculated by the calculation equation $\{360°-(360°\div X)\}\div Sn=\theta n$, to the total setting number X of the magnetic poles 8, 9 that is 14 pieces, the total setting number (number of poles) Sn of stator poles 17 becomes six pieces (six poles), and θn becomes pitch angle of 55.7°, and there is a wide interval (angle) 81.5° at only one position. Further, in the present power generator 50, the relation of the total setting number X of magnetic poles 8, 9 and the total setting number Sn of stator poles 17 is that where the value of X/Sn (=14/6) does not become an integer. And pitch interval Pr between same magnetic poles of the magnetic pole rotor 7 is different from stator pole interval Pt of two stator poles 17 opposing magnetic pole. The other structures are same as those in the power generator 1 according to the first embodiment and omitted herein. According to the power generator 50 of the second embodiment, it is possible to obtain the same effects as those of the power generator 1 according to the first embodiment.

Figure 12:
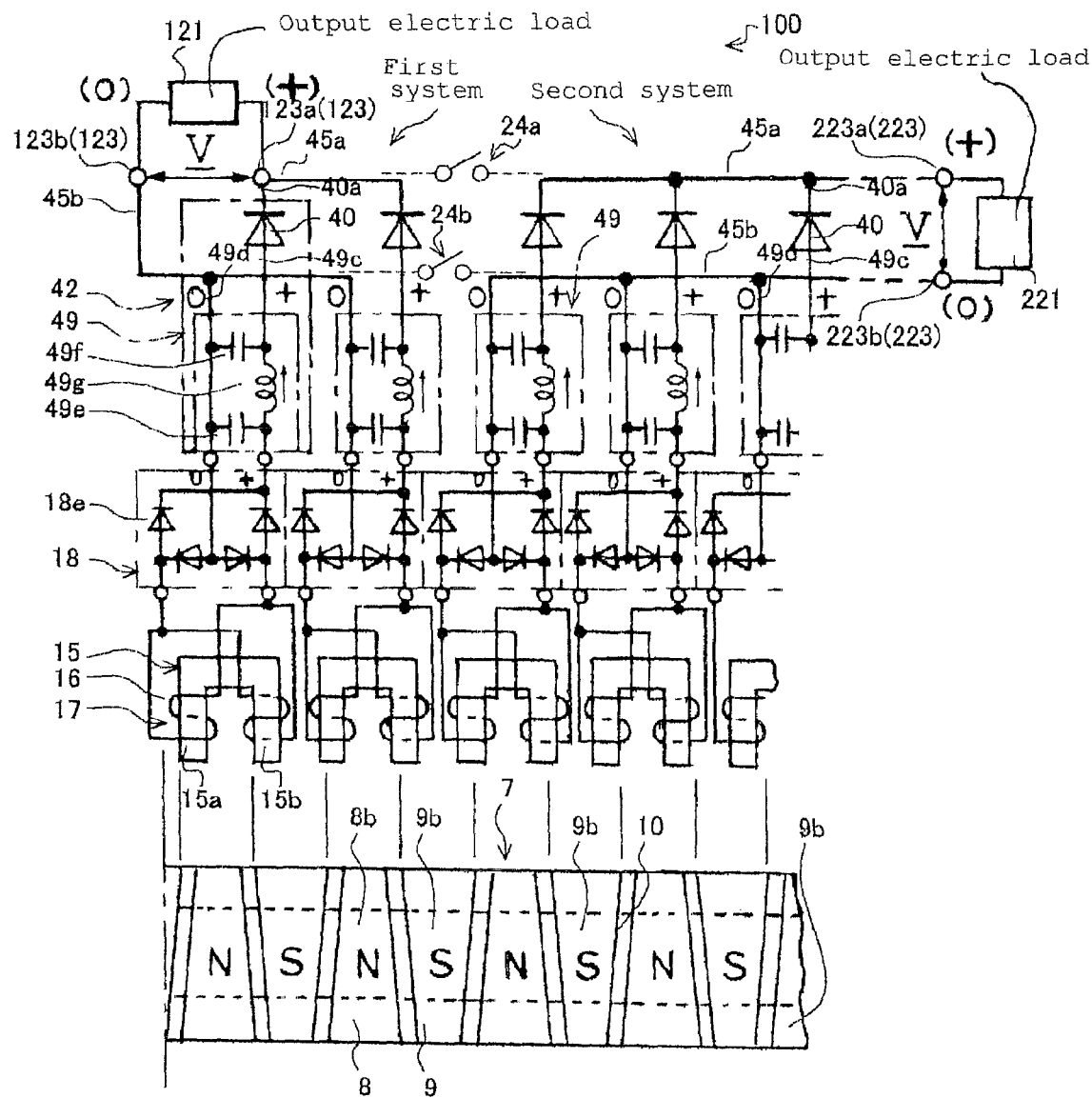
FIG. 12 is a cross sectional view showing a third embodiment according to the present invention.

Next, a third embodiment of a power generator under the present invention is explained hereinafter. This power generator 100, as shown in FIG. 12, eight sets of phase circuits 42 are divided into two systems of two sets of phase circuits 42 and remaining six sets of phase circuits 42, and are collectively connected to load circuits 121, 221 (two circuits) respectively. That is, in the present power generator 100, two systems, the two sets of phase circuits 42 as a first system, and the remaining six sets of phase circuits 42 as a second system, are assembled. And, each of the first and second systems is structured to include two pairs of electric power output portions 123, 223 having (+) output portion terminals 123a, 223a formed by collectively connecting positive (+) poles of output ends of respective rectifiers 40, and output portion terminals 123b, 223b formed by collectively connecting (O) poles of output side in respective smoothing circuits 49. And, the electric power output portion 123 of the first system is connected to load circuit 121, and the electric power output portion 223 of the second system is connected to load circuit 221. Further, in stator coils 16 independently wound per core portions 15a, 15b of stator poles 17, opposing both ends are connected each other, and connected in parallel to the input side of the rectifying circuit 18. The other structures are same as those in the power generator 1 according to the first embodiment and omitted herein.

In the case of such a power generator 100, it is possible to obtain the same effects as those of the power generator 1 according to the first embodiment, and in addition, since each pair of electric power output portions 123, 223 are arranged to the first and second systems respectively, it is possible to connect respective load circuits 121, 221 to meet the use purpose to the electric power output portions 123, 223. Further, it is possible to arrange switches 24a, 24b between the electric power output portions 123, 223, and connection, or separation (separated use) can be made, and it is used for many purposes. And, it is possible to supply DC electric power to each of the load circuits 121, 221 at high efficiency and at high output.

Figure 13:
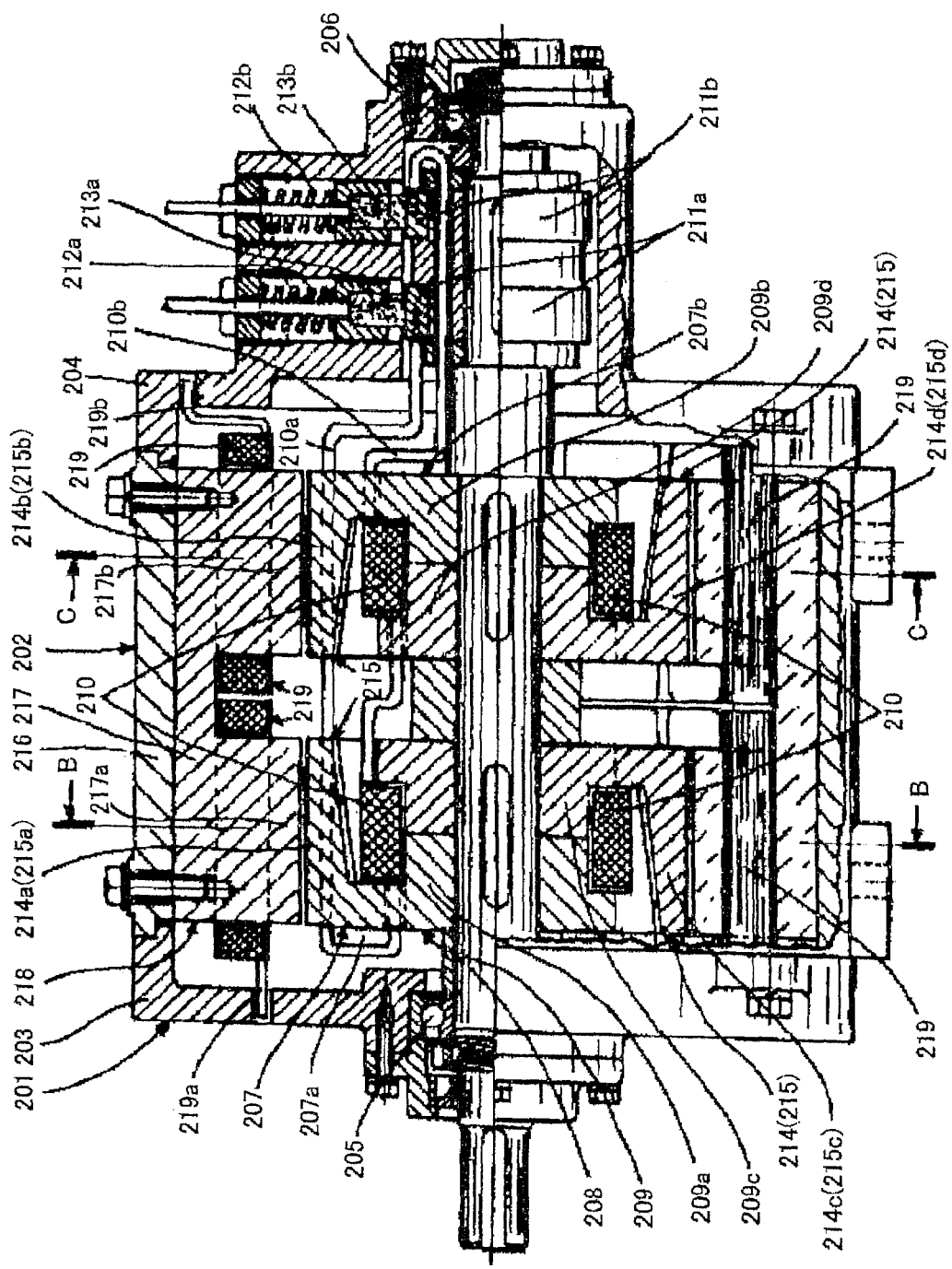
FIG. 13 is a front view showing a fourth embodiment of a power generator according to the present invention, and its upper half is shown in cross sectional view.
Figure 14:
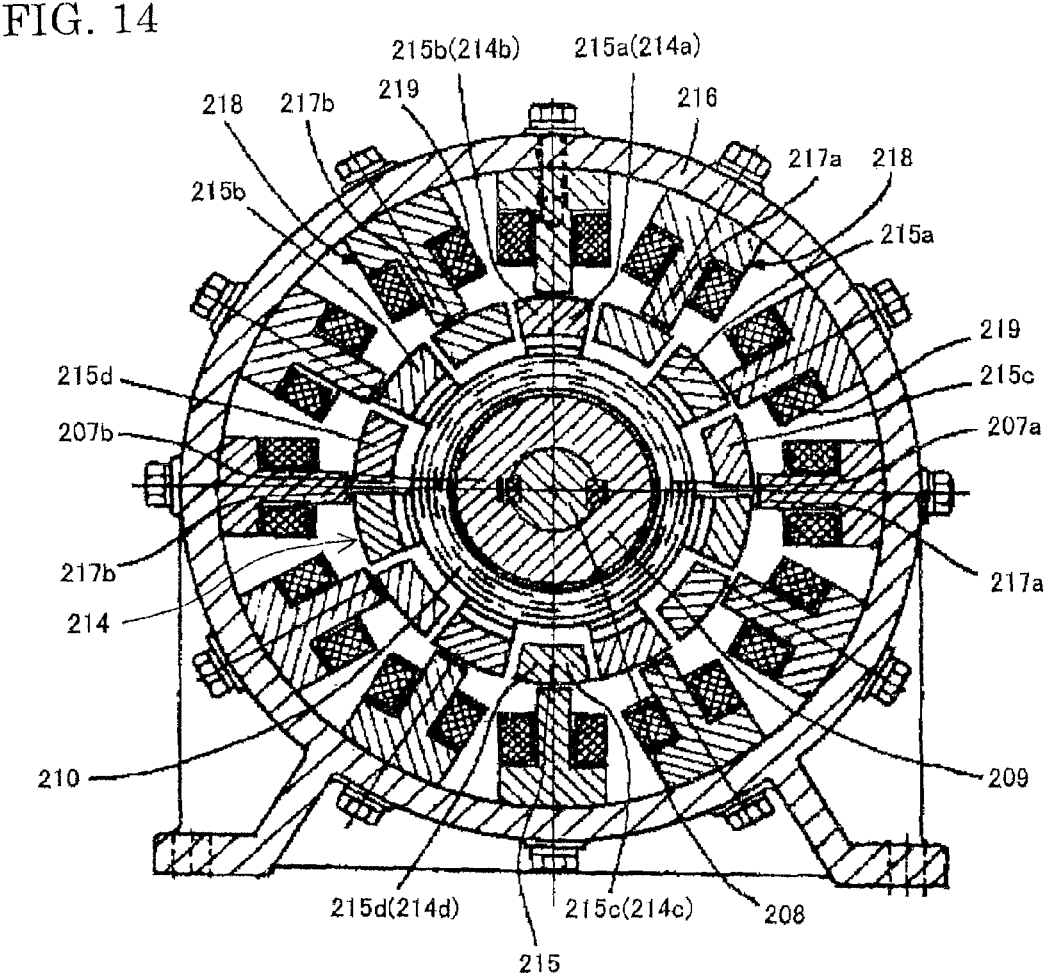
FIG. 14 is a cross sectional view of a fourth embodiment with FIG. 13 as its front view, and the right half is the cross sectional view at B-B, and the left half is the cross sectional view at C-C.
Figure 15:
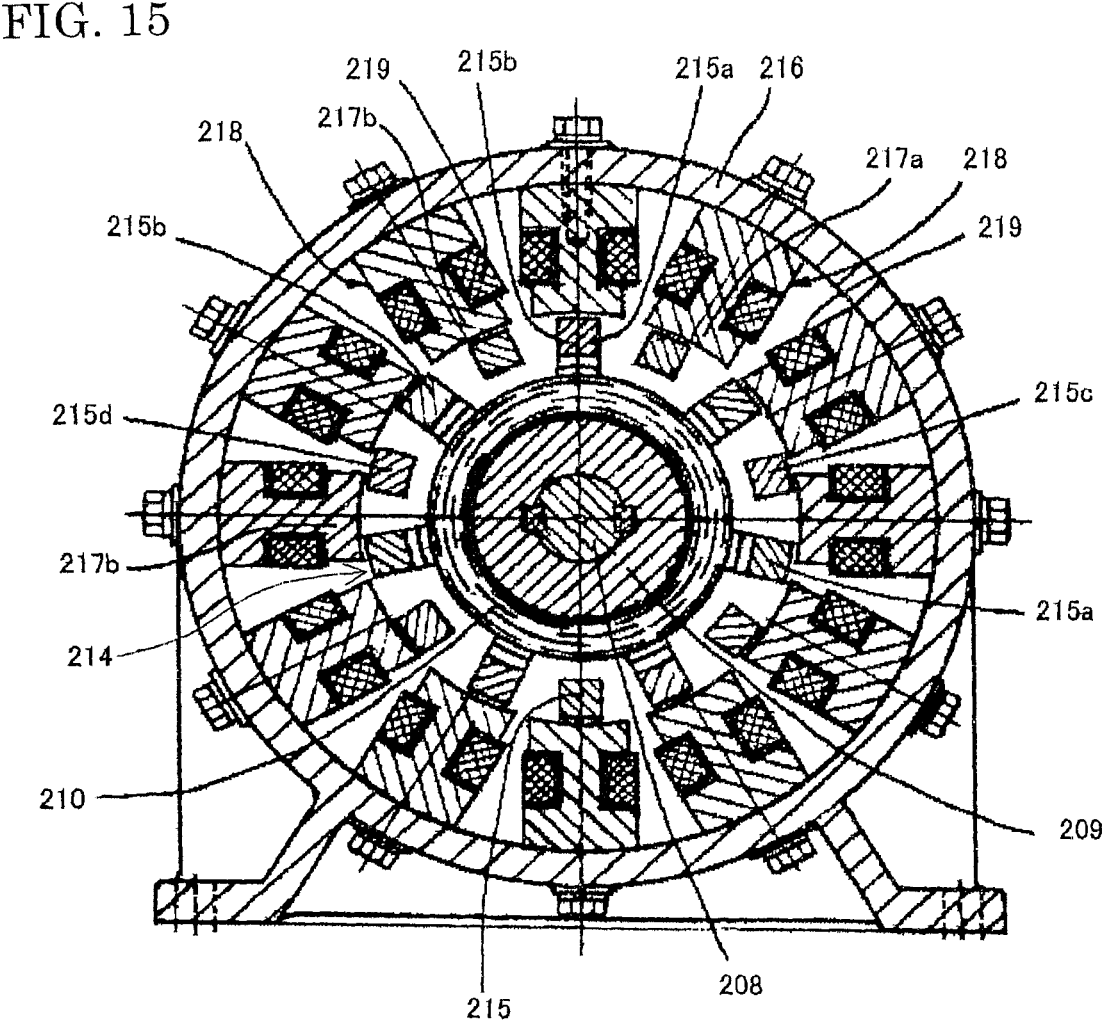
FIG. 15 is across sectional view showing a fifth embodiment with FIG. 13 as its front view, and the cross sectional view at the same position as in FIG. 14.
Figure 16:
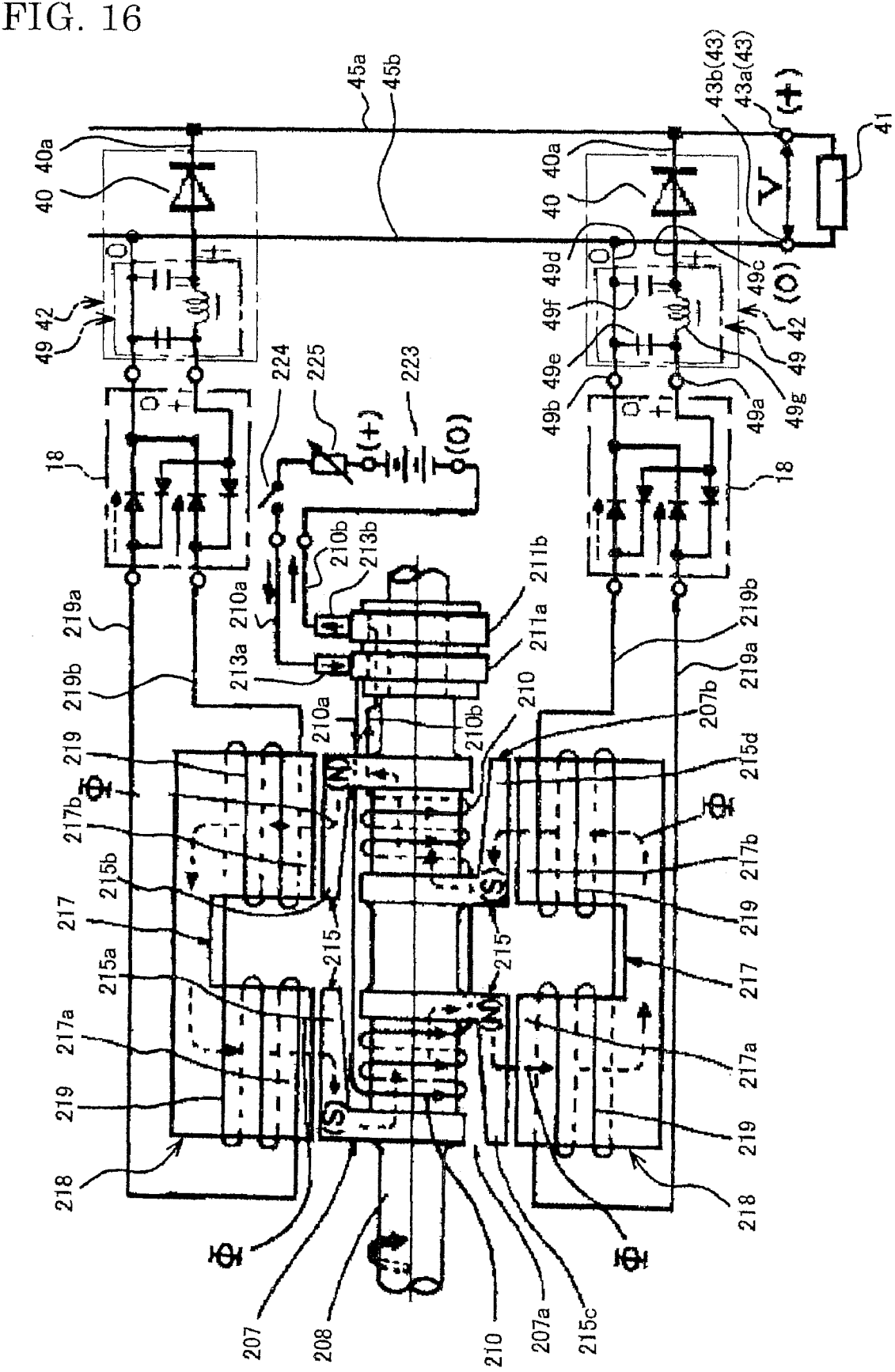
FIG. 16 is a schematic diagram for explaining the power generation principle of the power generator in FIG. 13.

Next, FIG. 13 is a front view showing a fourth embodiment of a power generator according to the present invention, and its upper half is shown in cross sectional view. FIG. 14 shows a cross sectional view of FIG. 13, and the right half is the cross sectional view at B-B, and the left half is the cross sectional view at C-C. Further, FIG. 16 is schematic diagram showing a principle. And, FIG. 15 shows a fifth embodiment, and that is the cross sectional view at the same position as in FIG. 14.

In left and right end frames 203, 204 structuring casing 2 of the present power generator 201, shaft supporting portions 205, 206 are formed. By the shaft supporting portions 205, 206, a rotor 207 of a pair of Landell shape magnetic pole rotors 207a, 207b as a pair is supported. On the outer circumference of rotor shaft 208 of the rotor 207, two pairs of coil frames 209 (209a, 209b, 209c, 209d) are engagedly attached. To the coil frame 209, exciting magnetic coil 210 is wound round in right winding. And, the coil end portions 210a, 210b of the exciting magnetic coil 210 are connected to a pair of slip rings 211a, 211b engagedly attached to one end portion of the rotor shaft 208. To the slip rings 211a, 211b, brushes 213a, 213b that pop out by spring force of springs 212a, 212b are slidably attached.

Two pairs of coil frames 209 engagedly attached to the rotor shaft 208 are arranged as tooth shape portions 214 (214a, 214b, 214c, 214d) with 14 pieces of N poles, S poles alternately arranged in left and right outer circumference in the axial direction, at regular angle intervals, and form left and right magnetic pole rotors 207a, 207b. In each tooth shape portion 214, pole cores 215a, 215b of magnetic pole portion to form twin magnetic pole portion 215 where end portion is bent inward in the axial direction and left and right different poles are opposed to, and pole cores 215c, 215d whose end portion is bent outward in the axial direction in roughly same phrase. Thereby, 14 sets of twin magnetic pole portions 215 consisting of two pairs of pole cores 215a, 215b and 215c, 215d are formed, and rotor 207 having a pair of field magnetic poles is formed. Further, between the left and right end frames 203, 204, casing 202 where cylindrical fixed frame 216 is arranged is structured, and in the inner circumference of the fixed frame 216, stator pole 218 where 12 stator iron cores 217 are arranged at regular angle intervals is formed.

Meanwhile, in order for each stator pole 218 to generate armature current, and, to make magnetic field independently work and increase power generation efficiency, it is necessary to magnetically insulate the portion between the stator pole 218 and the fixed frame 216, and the raw material of the fixed frame 216 is formed of nonmagnetic material, such as aluminum. Further, the relation of the number X of pole cores 215a, 215b and the total setting number Sn of stator poles 218 is, in the above case, where X=14, Sn=12, X>Sn where any of values of X/Sn or Sn/X does not becomes an integer, but X<Sn is acceptable too. At this moment, pitch interval between pole cores 215a of same magnetic poles becomes different from stator pole interval between two stator poles 218 opposing magnetic poles.

Stator iron core 217 is formed into roughly U shape cross section where a pair of separated core portions 217a, 217b are protruded from both ends of connection beam. The separated core portions 217a, 217b are arranged along the axial direction of the rotor shaft so that the stator iron core 217 is over a pair of magnetic pole rotors 207a, 207b. That is, one of separated core portion 217a is arranged for the protruded end to oppose outer circumference of pole cores 215a, 215c via space. And the other separated core portion 217b is arranged for the protruded end to oppose outer circumference of pole cores 215b, 215d via space.

To the respective separated core portions 217a, 217b, stator coil 219 is wound round. The stator coil 219 is wound in right winding to the separated core portion 217b when viewed from the pole core 215b side. And, the stator coil 219 wound in right winding is wound to the separated core portion 217a, toward the pole core 215a on extension of right winding.

As shown in FIG. 16, coil both ends 219a, 219b of each stator coil 219 are connected to input terminal of full-wave rectifying circuit 18 made of four diodes, respectively. Output side (+) line end of the full-wave rectifying circuit 18 is connected to input side (+) terminal 49a of 12 smoothing circuit 49 individually independent arranged per each stator pole 218. Further, (O) line end of the full-wave rectifying circuit 18 is connected to (O) terminal 49b of the smoothing circuit 49.

In the same manner as the power generator 1 according to the first embodiment, the output side (+) line ends 49c of the smoothing circuit 49 are connected to input side of 12 rectifiers 40 arranged per each stator pole 218. Further, output side (+) line ends 40a of the rectifiers 40 are collectively (in parallel) connected to a (+) combination line 45a, and connected via (+) combination line 45a to (+) output portion terminal 43a. And, the (+) output portion terminal 43a is connected to (+) line end of the load circuit 41. Meanwhile, circuits between the full-wave rectifying circuit 18 and the load circuit 41 are same structures as in the first embodiment, therefore explanations of other connections are omitted herein.

Furthermore, the brush 213a is connected to the plus side terminal of DC power source circuit 223, and the brush 213b is connected to the minus side terminal respectively. In the DC power source circuit 223, open/close switch 224 and variable resistor 225 are arranged in series.

The operation of the power generator 201 of the above structure is explained hereinafter. The open/close switch 224 of the DC power source circuit 223 is closed, and the variable resistor 225 is adjusted and a specified DC power source is applied to exciting magnetic coil 210. And, the rotor 207 is rotated. Since the exciting magnetic coil 210 is wound in right winding, on the basis of the law of right screw, pole cores 215a, 215d side becomes S poles, and pole cores 215b, 215c side becomes N pole, and field magnetic main flux Φ occurs in the direction shown in FIG. 16. This field magnetic main flux Φ crosses sequentially in circle separated core portions 217a, 217b of the stator pole 218.

And, when the pole cores 215a, 215b, 215c, 215d rotate, and magnetic lines changes into increasing direction to the stator iron core 217, and at almost same time, magnetic lines by different pole core at the front in the rotational direction get into reverse proportion and change into decreasing direction, and on the basis of Faraday's law of magnetic induction and Lenz's law, by mutual induction effect by combination of both poles, electromotive force of plus combination effect occurs in the stator coil 219.

Further, when to the stator iron core 217, the magnetic lines change into decreasing direction, and at almost same time, magnetic lines by different pole core at the rear in the rotational direction get into reverse proportion and change into increasing direction, by mutual induction effect by combination of both poles, electromotive force of minus combination effect occurs in the stator coil 219. Thus, every time when the pole cores 215a, 215b, 215c, 215d pass through the independent stator iron core 217, individually independent induction electromotive force is induced to the stator coil 219 and AC current occurs. Generated AC current is rectified per each stator pole 218 by the full-wave rectifying circuit 18 and flows via the phase circuit 42 to load circuit 41.

When AC current is induced to the stator coil 219 of the individually independent stator pole 218, by this AC current, to the stator iron core 217, magnetic field magnetic power occurs in reverse direction to the flow direction of field magnetic main flux of N poles and S poles. Between this magnetic field magnetic power, and the exciting magnetic power of pole cores 215a, 215b, 215c, 215d, induction reaction magnetic power of reaction effect occurs, and on the contrary, induction absorption magnetic power (synthetic magnetic power) of absorption effect occurs. These both magnetic powers are divided into plus induction reaction magnetic power and plus induction absorption magnetic power (motor effect) to work in the rotational direction of the rotor 207, and minus induction reaction magnetic power and minus induction absorption magnetic power (brake effect) to work in the reverse rotational direction.

However, in the present power generator 201, by inducing AC current always to respective stator coil 219 by roughly the power factor 1, plus induction reaction magnetic power and plus induction absorption magnetic power are always made larger than minus induction reaction magnetic power and minus induction absorption magnetic power.

Further, exciting magnetic power of the pole cores 215a, 215b, 215c, 215d, even when there is no magnetic field in the stator iron core 217, gives to the separated core portions 217a, 217b of the stator iron core 217, plus absorption magnetic power of absorption effect in the rotational direction of the rotor 207 and minus absorption magnetic power of absorption effect in the rotor reverse rotational direction.

However, in the present power generator 201, the relation of the total setting number X of poles in one side magnetic pole portion of twin magnetic pole portion 215 and the total setting number Sn of the stator poles 218 is X>Sn or X<Sn, and that where the value of X/Sn or Sn/X does not become an integer, and the magnetic pole interval of poles of same polarity of the rotor 207 is made different from stator pole interval between the stator poles 218 opposing the twin magnetic pole portion 215, thereby the plus absorption magnetic power and minus absorption magnetic power are antagonistic to each other and are balanced, and offset with any phase of the rotor 207.

That is, when the present power generator 201 generates power, to the rotor 207m plus torque to the rotational direction of addition of plus induction reaction magnetic power, plus induction absorption magnetic power and plus absorption magnetic power, and minus torque to reverse rotational direction of addition of minus induction reaction magnetic power, minus induction absorption magnetic power and minus absorption magnetic power work at specified ratio, but by total effect, it is possible to largely reduce the minus torque and increase the ratio of the plus torque. Accordingly, it is possible to increase the conversion efficiency from mechanical power energy to electric energy. Meanwhile, in the present power generator 201 in the same manner as the power generator 1 according to the first embodiment, it is possible to take out current of roughly multiple of the number of phases of maximum generation current amount per one phase.

Figure 17:
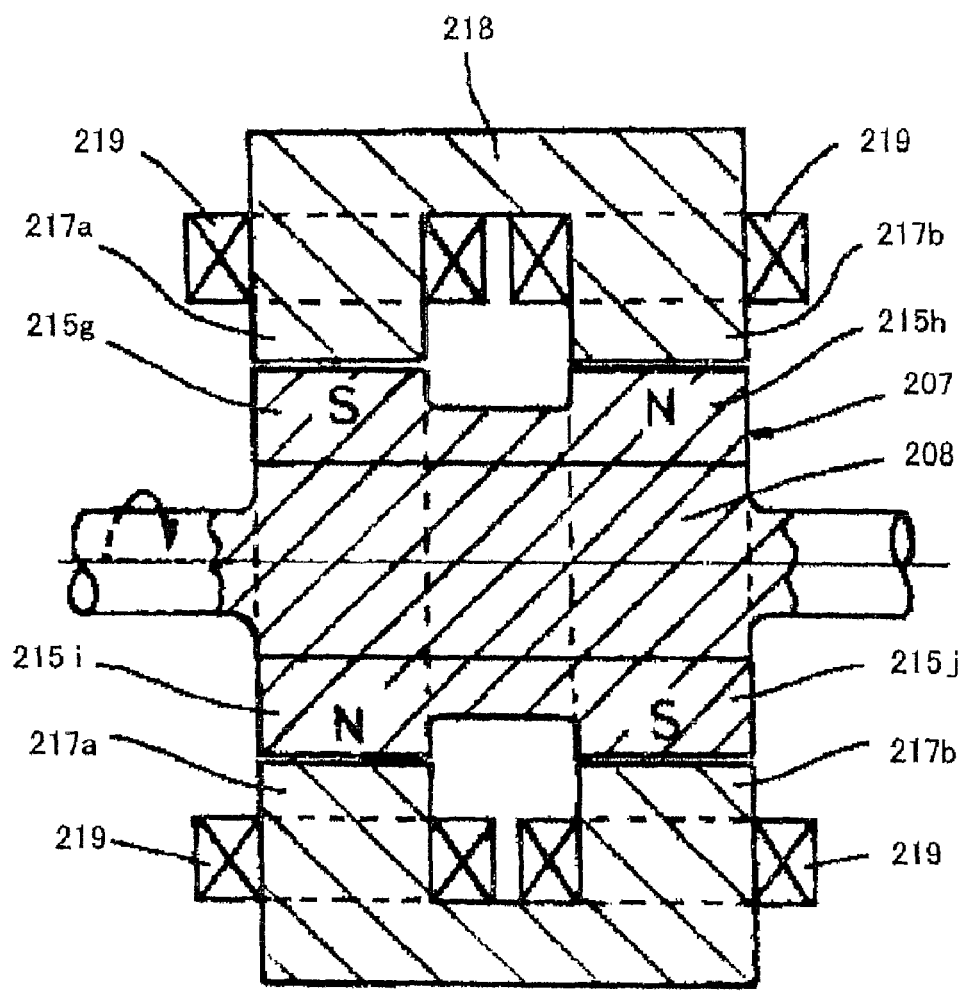
FIG. 17 is a schematic explanatory figure showing a sixth embodiment according to the present invention.
Figure 18:
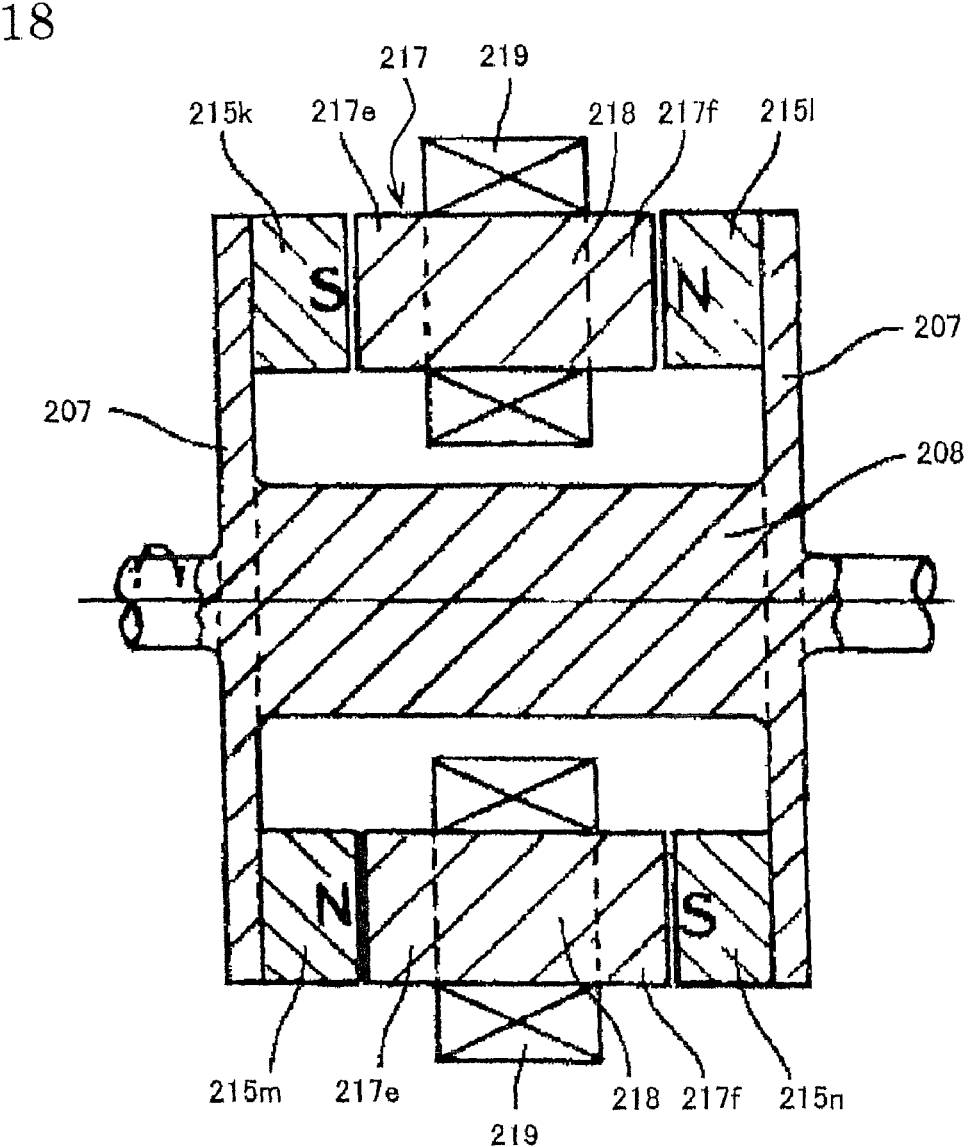
FIG. 18 is a schematic explanatory figure showing a seventh embodiment according to the present invention.

FIG. 17, FIG. 18 show sixth, seventh embodiments, and are modified examples of the fourth, fifth embodiments. Magnetic pole rotor 207 in FIG. 17 has pole cores 215g, 215h, 215i, 215j of permanent magnets. Further stator pole 218 in FIG. 18 has a structure where a pair of both protruded ends 217e, 217f of stator iron core 217 are formed along the axial direction in parallel with the rotor shaft and stator coil 219 is wound round. Further, magnetic pole rotor 207 has a structure where the pole cores 215k, 215l, and 215m, 215n are protruded from opposing surface side of two disks orthogonal to the rotor shaft 208 to the inside. And, the magnetic pole rotor 207 is arranged so as to pinch the stator iron core 217 from left and right. At this moment, pair of both protruded ends 217e, 217f of the stator iron core 217 are so arranged as to oppose pole cores 215k, 215l, and 215m, 215n. The 215k, 215l, and 215m, 215n in FIG. 18 are permanent magnets in the same manner as in FIG. 17, however, they may be of exciting magnetic coil type. In the cases according to the sixth, seventh embodiments, it is possible to obtain the same operation and effects as in the fourth, fifth embodiments.

Figure 19:
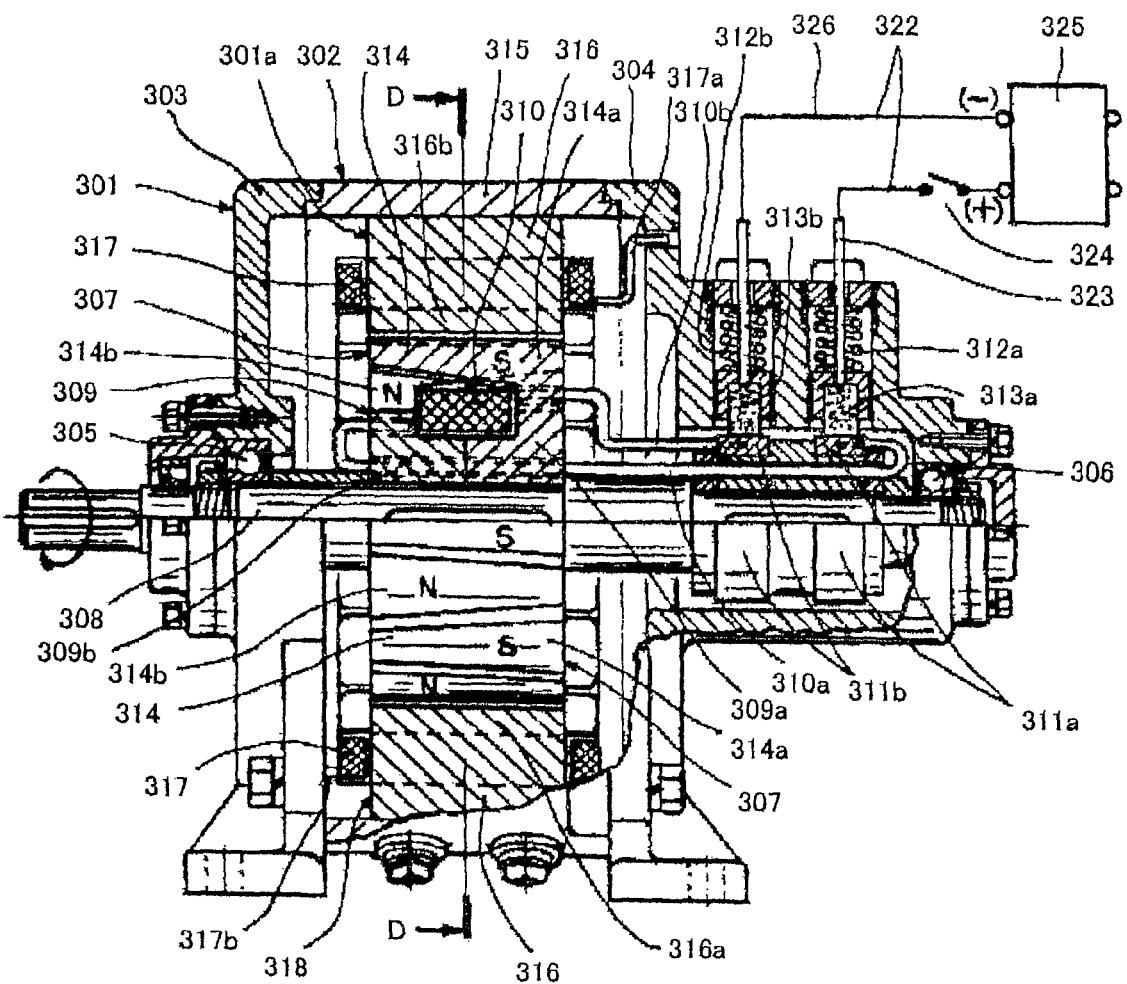
FIG. 19 is a front view showing an eighth embodiment of a power generator according to the present invention, and its upper half is shown in cross sectional view.
Figure 20:
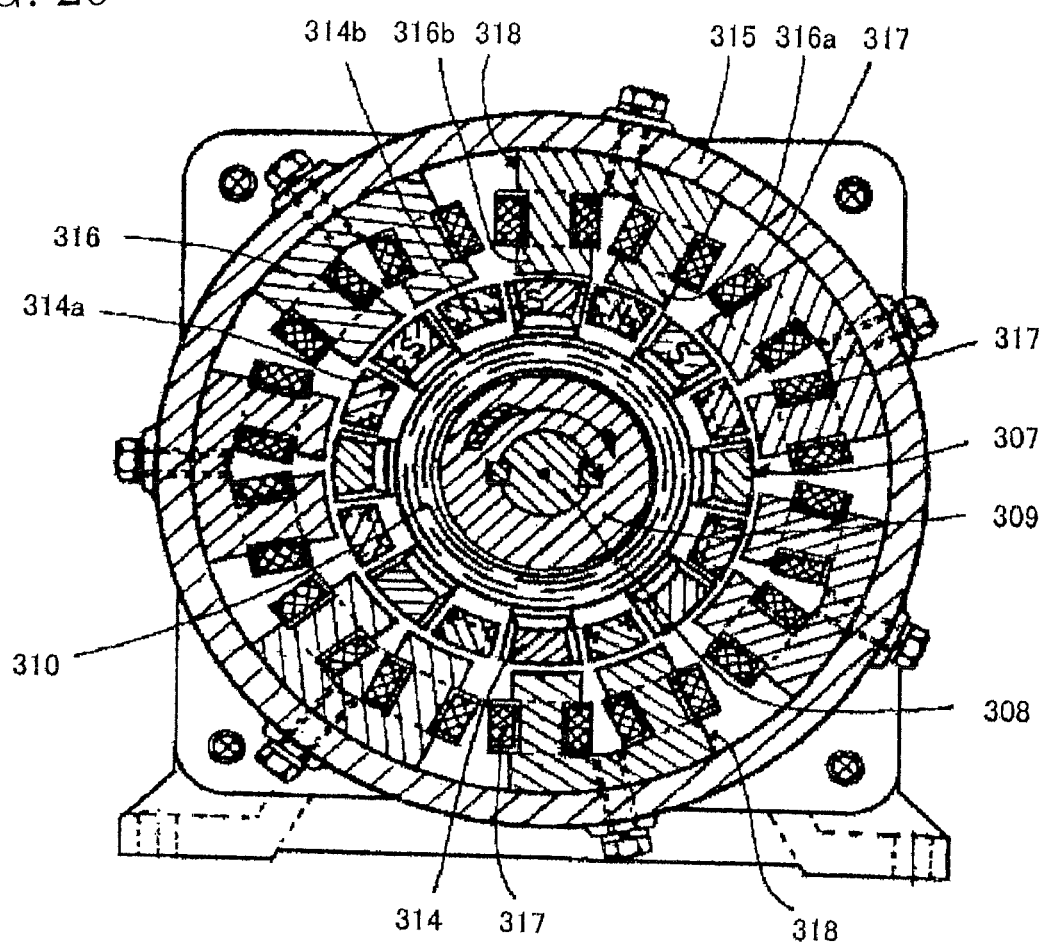
FIG. 20 is a cross sectional view at D-D of FIG. 19.
Figure 21:
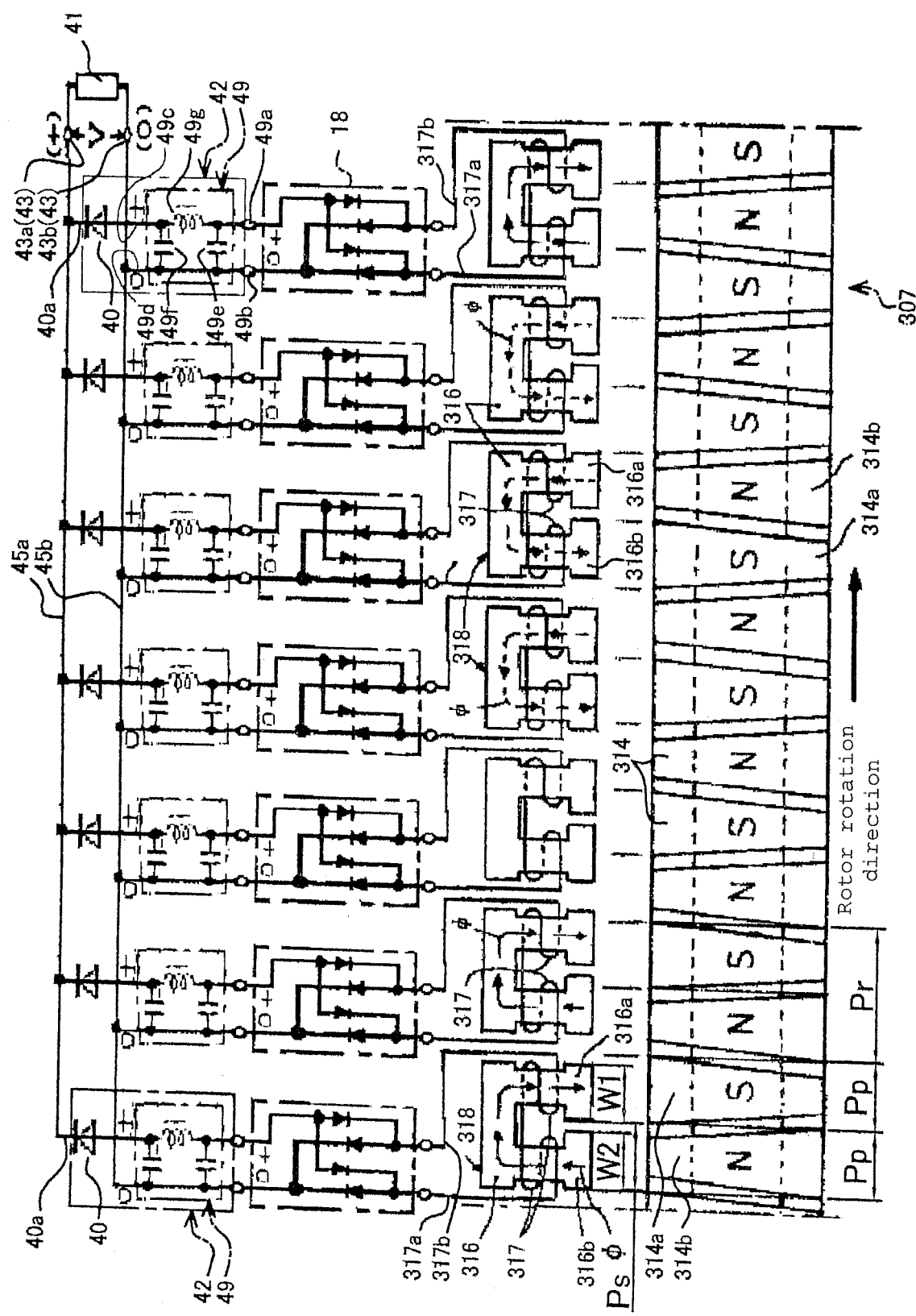
FIG. 21 is a schematic diagram of the stator iron cores and the magnetic poles shown FIG. 20.

Next, FIG. 19 is a front view showing an eighth embodiment of a power generator according to the present invention, and its upper half is shown in cross sectional view. FIG. 20 shows a cross sectional view at D-D of FIG. 19. FIG. 21 is a schematic diagram for explaining the power generation principle of the power generator in FIG. 19. In left and right end frames 303, 304 to structure casing 2 of the present power generator 301, shaft supporting portions 305, 306 are formed. By the shaft supporting portions 305, 306, a rotor 307 of Landell shape is supported. On the outer circumference of rotor shaft 308 of the rotor 307, coil frames 309 (309a, 309b) are engagedly attached. The coil frames 309 are wound around with the exciting magnetic coil 310. And, the coil end portions 310a, 310b of the exciting magnetic coil 310 are connected to a pair of slip rings 311a, 311b engagedly attached to one end portion of the rotor shaft 308. To the slip rings 311a, 311b, brushes 313a, 313b that pop out by spring force of springs 312a, 312b are slidably attached.

In the coil frame 309 engagedly attached to the rotor shaft 308, 16 pieces in total of S pole cores 314a and N pole cores 314b of magnetic poles 314 made of metal where magnetic flux is easily to flow left and right outer circumference in the axial direction are arranged. The respective cores form magnetic rotor 307 having filed magnetic poles arranged in gear shape, with end portion inward in the axial direction, alternately at regular angle intervals. And, between left and right end frames 303, 304, a cylindrical fixed frame 315 is arranged to structure casing. In the inner circumference of the fixed frame 315, stator poles 318 are arranged at roughly regular angle intervals. The stator pole 318 is formed of stator iron core 316 formed to have cross section roughly C shape iron core where a pair of front core portions 316a and rear core portion 316b are protruded in the front and rear in the rotor rotational direction, and a stator coil 317 wound round the front core portion 316a and the rear core portion 316b of the stator iron core 316. The stator iron core 316 is structured by laminating silicon steel plates. Iron core widths W1, W2 between the front core portion 316a and the rear core portion 316b in the rotor rotation direction are formed so as to be narrower than core interval Ps. Such stator pole 318 is arranged so that both protruded ends of the front core portion 316a and the rear core portion 316b are opposed to with slight gap in outer circumference of the S pole core 314a and the N pole core 314b, and a pair of core portions are put along the rotational direction of the rotor shaft. Meanwhile, the magnetic pole 314 is arranged so that magnetic pole width Pp that is ½ pitch of pitch interval Pr between same magnetic poles should become roughly same as the core interval Ps between the front core portion 316a and the rear core portion 316b.

The stator coil 317 is wound in right winding to the rear core portion 316b when viewed from the magnetic pole 314 side of the magnetic pole rotor 307. And, the stator coil 317 wound in right winding is wound to the front core portion 316a, toward the pole core 314 of the magnetic pole rotor 307 on extension of right winding.

Meanwhile, the fixed frame 315 is made of aluminum as nonmagnetic raw material, thereby portion between stator iron cores 316 are magnetically insulated, and independent armature current occurs par stator iron core 316, and magnetic field works independently. Further, the relation of the total setting number X of S pole cores 314a and N pole cores 314b, and the total setting number Sn of stator poles 318 is that where the value of X/Sn does not become an integer. That is, the magnetic pole interval between magnetic poles of same polarity of the magnetic pole rotor 307 is different from the stator pole interval between stator poles 318 opposong to the macnestic poles 314. In the present power generator 301, X=16, Sn=7.

As shown in FIG. 21, coil both ends 317a, 317b of each stator coil 317 are connected to input terminal of the full-wave rectifying circuit 18 made of four diodes, respectively. Output side (+) line ends of the full-wave rectifying circuit 18 are connected to input side (+) line end of seven smoothing circuit 49 individually independent arranged per each stator pole 318. Further (O) line ends of the full-wave rectifying circuit 18 are connected to (O) terminal 49b of the smoothing circuits 49.

In the same manner as in the power generator 1 according to the first embodiment, the output side (+) line ends 49c of the smoothing circuit 49 are connected to input side of seven rectifiers 40 arranged per each stator pole 318. Further, output side (+) line ends 40a of the rectifiers 40 are collectively (in parallel) connected to a (+) combination line 45a, and connected via (+) combination line 45a to (+) output portion terminal 43a. And, the (+) output portion terminal 43a is connected to (+) line end of the load circuit 41. Meanwhile, circuits between the full-wave rectifying circuit 18 and the load circuit 41 are same structures as in the first embodiment, therefore explanations of other connections are omitted herein.

Furthermore, as shown in FIG. 19, one of the DC power source circuits 322 for the exiciting magnet is connected from brush 313a via plus connection electric line 323 and open/close switch 324 to the plus side terminal of DC power source controller 325. And, the other is connected from brush 313b via minus connection electric line 326 to the minus side terminal of DC power source controller 325.

Next, the operation of the power generator 301 of the above structure is explained hereinafter. The open/close switch 324 of the DC power source circuit 322 for the exiciting magnet is closed, and DC power source controller 325 is adjusted automatically or manually and a specified DC power source is applied to exciting magnetic coil 310. And, magnetic pole rotor 307 is rotated by external mechanical power such as a drive motor or the like. Since the exciting magnetic coil 310 is wound in right winding, on the basis of the law of right screw, S pole cores 314a side becomes S poles, and N pole cores 314b side becomes N pole. Field magnetic main flux Φ occurring by the S poles and N poles occurs in the direction shown in FIG. 21. When the magnetic pole rotor 307 rotates, in pole cores 314a and 314b, N poles and S poles change alternately, to the front core portion 316a and rear core portion 316b of the stator pole 318. Accordingly, the flow direction of field magnetic main flux Φ alternately changes and reciprocates in the circumferential direction (forward and backward direction to the rotational direction of magnetic pole rotor 307) between the front core portion 316a and the rear core portion 316b of each stator iron core 316.

And, S pole core 314a and N pole core 314b rotate and move, and magnetic power line of field magnetic main flux Φ changes into the increasing direction to the front core portion 316a and rear core portion 316b of stator pole 316. At the same time, magnetic power line of different pole core of the front (to rotor rotational direction, same hereinafter) of parallel operation get into reverse proportion and change into decreasing direction, and on the basis of Faraday's law of magnetic induction and Lenz's law, by mutual induction effect by combination of both poles, electromotive force of plus, minus alternate electromotive force occurs in the stator coil 317.

Further, from the position where the generation of plus or minus electromotive force reaches peak, S pole core 314a and N pole core 314b rotate and move further, and the magnetic power line changes into decreasing direction to the front core portion 316a, the rear core portion 316b. Along the change, when the magnetic power line by the rear different pole core gets in at the same time, and gets into reverse proportion and change into increasing direction, by mutual induction effect by combination of both poles, alternately in cycle of passing through 0 from plus (peak) to minus (peak), or passing through 0 from minus (peak) to plus (peak), induction electromotive force occurs in stator coil 317. Thus, every time when the S pole core 314a and the N pole core 314b alternately pass core portions 316a, 316b, individually independent AC current occurs in stator coil 317. Generated AC current is rectified by the full-wave rectifying circuit 18 arranged per each stator pole 318 and becomes DC via phase circuit 42 and flows to load circuit 41.

When the magnetic pole rotor 307 rotates, to the stator coil 317, by mutual induction effect, induction AC electromotive force is induced, and AC current (plus current and minus current flow alternately) occurs and at the same time magnetic field occurs. The magnetic field generates field magnetic power to the flow direction to positive and reverse alternation of field magnetic main flux Φ in respectively opposing direction. And, between the field magnetic power generating in the front core portion 316a, the rear core portion 316b of stator iron core 316, and the exciting magnetic power by field magnetic main flux Φ generated in the N pole core 314b, the S pole core 314a of the magnetic pole 314, induction reaction magnetic power of reaction effect, and induction absorption magnetic power of absorption effect on the contrary occur. These both magnetic powers are divided into plus induction reaction magnetic power and plus induction absorption magnetic power (motor effect) to work in the rotational direction of the rotor 307, and minus induction reaction magnetic power and minus induction absorption magnetic power (brake effect).

However, in the present power generator 301, by inducing AC current always to the respective stator coil 317 by roughly power factor 1, plus induction reaction magnetic power and plus induction absorption magnetic power are always made larger than minus induction reaction magnetic power and minus induction absorption magnetic power.

On the other hand, the exciting magnetic power of the S pole core 314a, the N pole core 314b, even when there is no magnetic field in stator core 316, works on absorption magnetic power to core portions 316a, 316b of stator iron core 316. However, the relation of the total setting number X of pole cores 314a, 314b and the total setting number Sn of stator pole 318 is set so that X/Sn should not become an integer, and the magnetic pole interval between magnetic poles of same polarity of magnetic pole rotor 307 is made different from stator pole interval between the stator poles 218 opposing magnetic poles 314, in this absorption magnetic power, between all the pole cores 314a, 314b and core portions 316a, 316b of all the stator iron cores 316, plus absorption magnetic power to pull to the rotational direction of magnetic pole rotor 307, and minus absorption magnetic power to pull to the opposite direction of the rotational direction are antagonistic to each other and offset with any phase of the rotor 307, and in practice, rotation load torque of the rotor is reduced. Therefore, the influence by absorption magnetic power to drive power loss is reduced with any phase of the rotor 307.

That is, when the present power generator 301 generates power, to the magnetic pole rotor 307, plus torque to the rotational direction of addition of plus induction reaction magnetic power, plus induction absorption magnetic power and plus absorption magnetic power, and minus torque to reverse rotational direction of addition of minus induction reaction magnetic power, minus induction absorption magnetic power and minus absorption magnetic power work at specified ratio, but by total effect, it is possible to largely reduce the minus torque and increase the ratio of the plus torque. Accordingly, according to the power generator 301 of the eighth embodiment, it is possible to further increase the conversion efficiency from mechanical power energy to electric energy. Meanwhile, in the present power generator 301 in the same manner as the power generator 1 according to the first embodiment, it is possible to take out current of roughly multiple of the number of phases of maximum generation current amount per one phase. Further, as mentioned previously, the operation and effects of the present power generation 301 become same as those of the power generator 201 according to the second embodiment. In addition, with regard to the power generator 1 according to the first embodiment, same operation and effects as in the power generators 201, 301 can be obtained.

Figure 22:
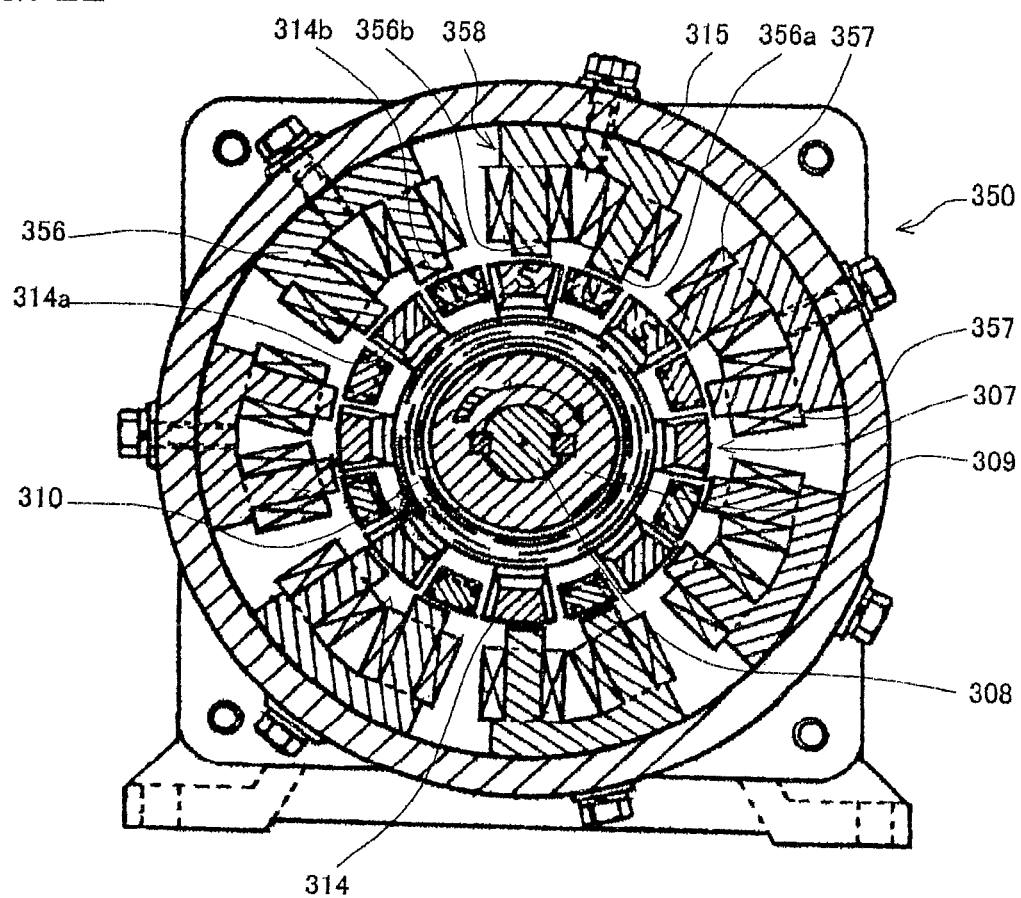
FIG. 22 is a cross sectional view showing a ninth embodiment of a power generator according to the present invention.

Next, FIG. 22 shows a ninth embodiment of a power generator according to the present invention, and is a cross sectional view at D-D in FIG. 19. In a power generator 350 according to the present ninth embodiment, in comparison with the power generator 301 according to the eighth embodiment, the shape of stator iron core 356 of stator pole 358 is different. That is, in the ninth embodiment, the stator iron core 356 is formed into roughly U shape cross section as in the same manner as in the power generator 1 according to the first embodiment, meanwhile in the eighth embodiment, the stator iron core 316 is formed so that both protruded ends of roughly U shape cross section are bent inward. Other structure and operation and effects are same as those of the eighth embodiment.

Next, power generation output characteristics of the power generator according to the present invention are explained hereinafter.

In order to obtain power generation output characteristics of the power generator according to the present invention, an experiment where the motor shaft of a power generator and motor shaft of a drive motor (200V, 1.5 kW, 4P, rated current 6 A, 3-phase AC motor, not illustrated) were jointed by coupling, and magnetic pole rotor was driven to rotate (1798~1714 rpm), and DC electric power is generated was carried out on commission to a trustworthy third party.

In the present experiment, the power generator 50 described as the second embodiment in FIG. 11 was employed. And the magnetic pole rotor of the power generator 50 was formed to have outer diameter φ174. And, to the magnetic pole rotor, a constant current 3 A was applied, by applying DC current 50.3V~53.9V to exciting magnetic coil wound round exciting magnetic iron core shaft, and thereby a specified amount of exciting magnetic power occurring in both magnetic poles was secured. Further, in stator pole, stator coil (diameter φ1) was wound round each core portion 290 times, and a specified amount of field magnetic power was secured.

In the present experiment, roughly 100% output load was given to output electric power generated per each of six stator poles, and output of each stator pole was added by one piece (one phase). And, at every addition, current and voltage of power generation output in the power output portion 43 of the power generator 50 were measured. At the same time, load current and the number of rotation in the drive motor were measured.

Figure 23:
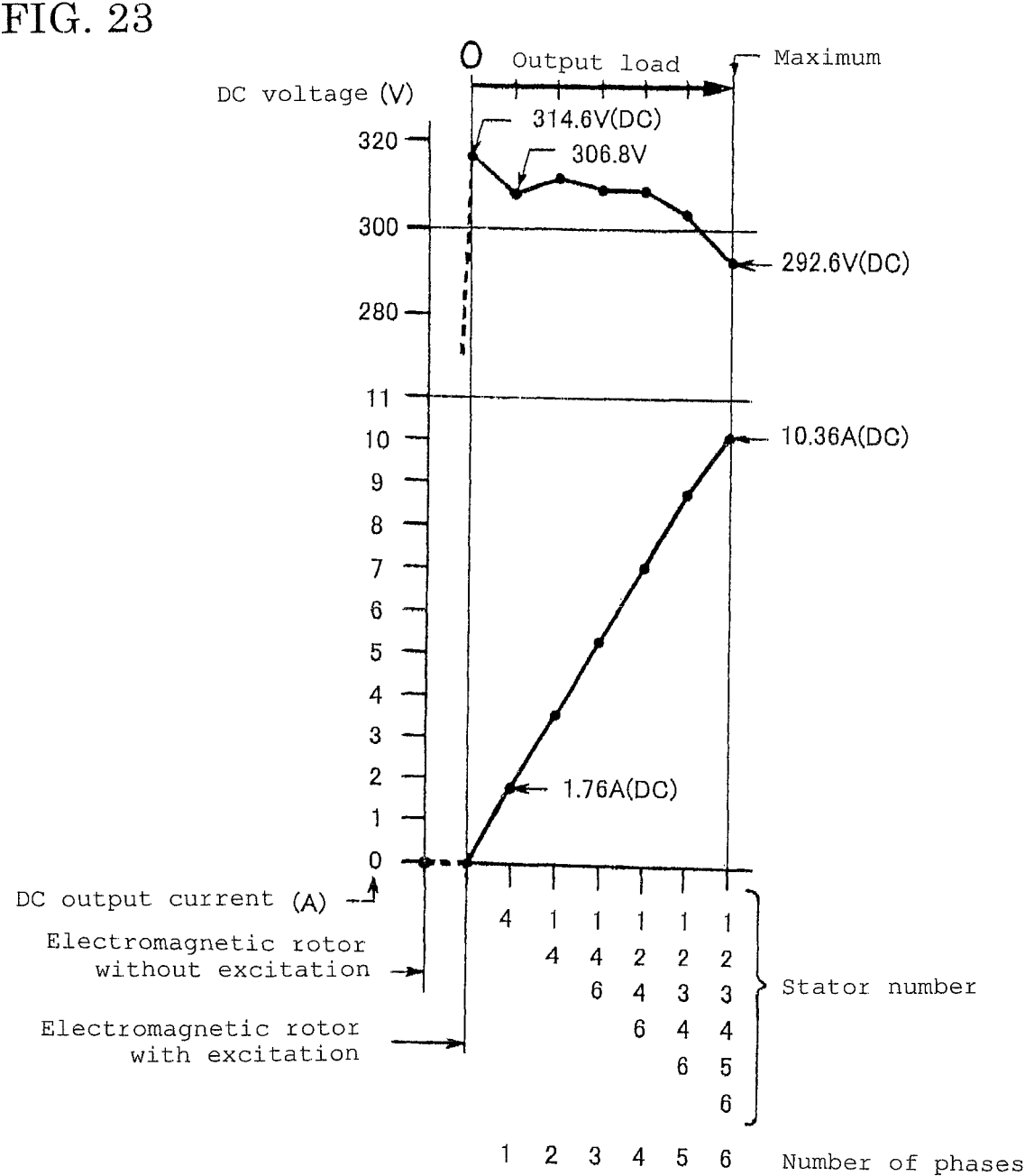
FIG. 23 is a characteristic figure showing the measurement results of output voltage and output current of the power generator in FIG. 11.

Graph at the upper stage in FIG. 23 shows the measurement results of output voltage in the power generator 50. From the results, it is known that by adding the output of stator pole, the output voltage increases and decreases between 292.6V and 314.6V.

Graph at the lower stage in FIG. 23 shows the measurement results of output current in the power generator 50. From the results, it is known that the DC current increases in linear function manner as the number of phases increases.

Figure 24:
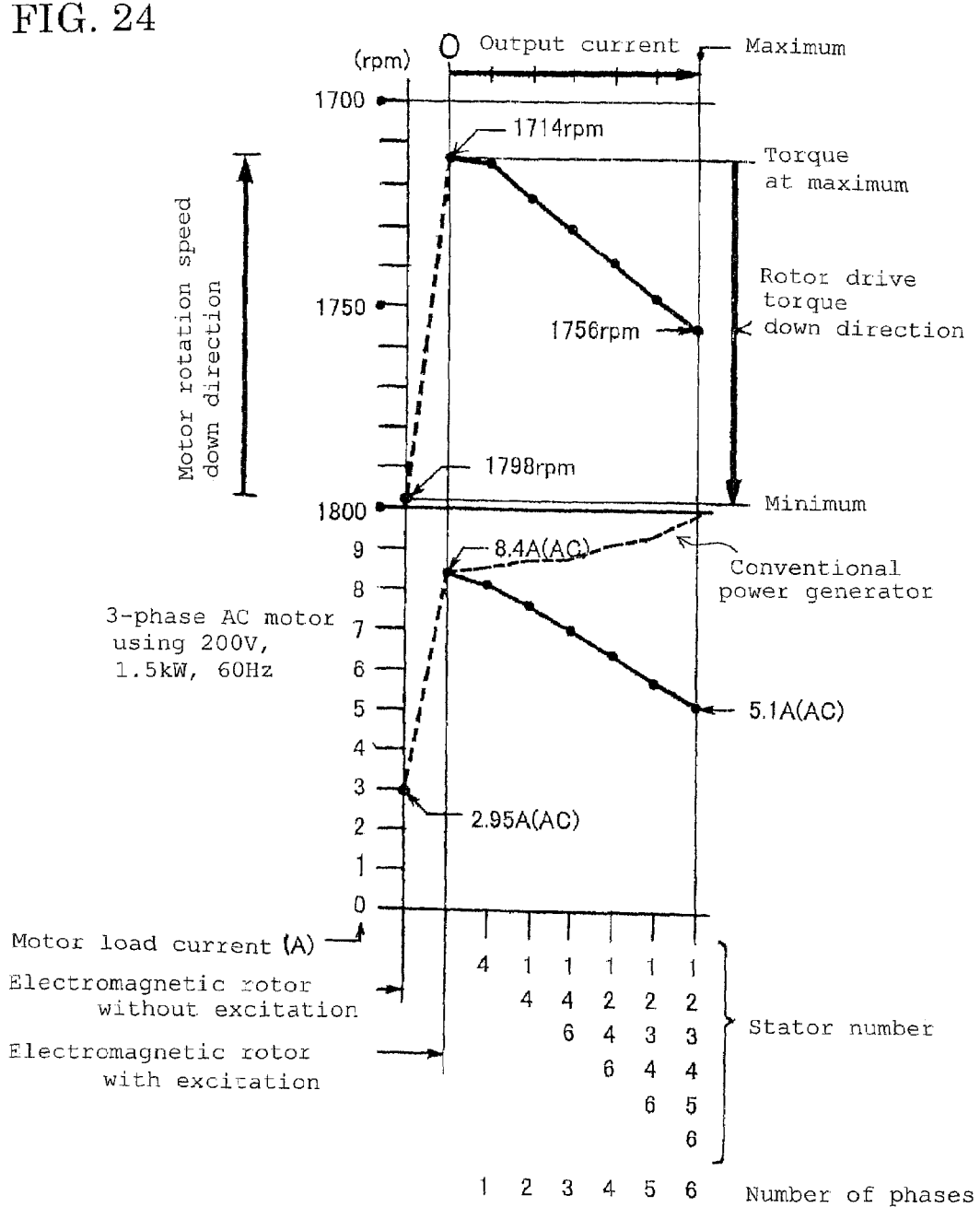
FIG. 24 is a characteristic figure showing the measurement results of the number of rotation and load current of the drive motor.

Graph at the upper stage in FIG. 24 shows the measurement results of the number of rotation in the drive motor. From the results, it is known that in present exciting magnet (exciting magnetic current 3 A constant) of magnetic pole rotor, as the output load becomes large (up to 6 phases) from output non load moment, the motor rotation speed increases proportionally. At the same time, the drive torque to rotate the magnetic pole rotor decreases proportionally. Herein, the characteristics of the drive torque changes in the same manner as the motor rotation speed.

Graph at the lower stage in FIG. 24 shows the measurement results of the load current in the drive motor. From the results, it is known that in present exciting magnet (exciting magnetic current 3 A constant) of magnetic pole rotor, as the output load becomes large (up to 6 phases) from output non load moment, the motor load current value decreases (8.4 A to 5.1 A) in reverse proportion.

Next, power generation output characteristics obtained from the power generation experiment of the power generator 50 are examined hereinafter.

In the case of conventional power generators, output current that can be taken out to load circuit is constant at maximum power generation current amount per phase irrespective of the number of phases of AC waveform induced by stator pole. While on the other hand, in the present power generator 50, current of roughly six times (for 6 phases) the maximum generation current amount per phase can be taken out. This is thought that it comes from that the output current coming from other phase circuit 43 is prevented by rectifier 40. Further, in the case of conventional power generators, as the output load to power generation electric power increases, large rotor rotation drive load works onto magnetic pole rotor side proportionally. Accordingly, in motor load current value, as the output load at stator power generator side increases, motor load current value increases in proportion with the output load, and goes up to the right as shown in broken line in FIG. 24. Further, in motor rotation speed and rotor drive torque, as the output load at stator power generation side becomes large (up to 6 phases), the rotation speed gradually decreases in reverse proportion with the increase of the output load, and the rotor drive torque increases on the contrary. While on the other hand, in the present power generator 50, drive motor load current and rotation drive load can be decreased. This is thought that strong field magnetic power occurring by taking out current amount of roughly six time (for 6 phases) to maximum generation current amount per phase, at roughly power factor 1, to magnetic pole rotor, increases plus torque, and decreases minus torque. Meanwhile, it has been proved that the power generation output characteristics of other power generators according to the present invention show the same change tendency as the power generation output characteristics by other verification experiments.

That is, from the power generation output characteristics as experimental facts, it can be said that the power generator according to the present invention can take out current of roughly multiple of the number of phases of maximum generation current amount per phase, and can generate power at higher efficiency and higher output than the conventional power generators.

Meanwhile, the present invention is not limited to the above embodiments, but the present invention may be embodied by appropriately modifying the structural components thereof without departing from the spirit or essential characteristics thereof, as listed up hereinafter.

(1) The arrangement, the number of magnetic pole rotors, the shape, arrangement, number of stator poles, and circuit structures of stator coil, full-wave rectifying circuit and smoothing circuit and the like, and the lines and the like of rectifiers may be changed appropriately. For example, as for magnetic pole rotor, besides Landell type, celent type, windmill type, tandem type or rotor type using permanent magnet (refer to the magnetic pole rotor 207 of the sixth embodiment in FIG. 17), two or more disks shape (refer to the magnetic pole rotor 207 of the seventh embodiment in FIG. 18), and rotating body of bowl shape or the like may be used.

(2) In the present invention, the rectifier 40 is not limited to rectification element single body such as silicon diode, but multiple elements such as thyrister may be used so long as it works as a stop valve.

(3) The number of electric power output portion is not limited to a pair or two pairs, but within the limit of the total setting number of phase circuits, plural pairs may be arranged. And, within the limit of the total setting number of stator poles, beside at least one system, at least one conventional circuit to convert AC into DC (circuit each having rectifying circuit and smoothing circuit independently) may be assembled in.

(4) Stator pole is not limited to magnetic pole outside opposing side of magnetic pole rotor, but in the case of a power generator where stator pole is arranged in the inside of magnetic pole rotor, it may be arranged at magnetic pole inside opposing side.

(5) As for smoothing circuit, it is not always necessary to use known (illustrated) circuit structure, but for example, one coil in smoothing circuit may be used in not only (+) side one piece (illustrated) but also used in (+) side and (O) side, and, in the place of coil, diode or the like may be used. Further, one capacitor may be used too.

(6) Rectifying circuit is not limited to a full-wave rectifying circuit, and a half-wave rectifying circuit may be employed.

(7) Between stator coil and rectifying circuit, power factor improving reactor, or power factor improving capacitor may be arranged. In this case, power factor can be improved and conversion efficiency can be enhanced.

Figure 25:
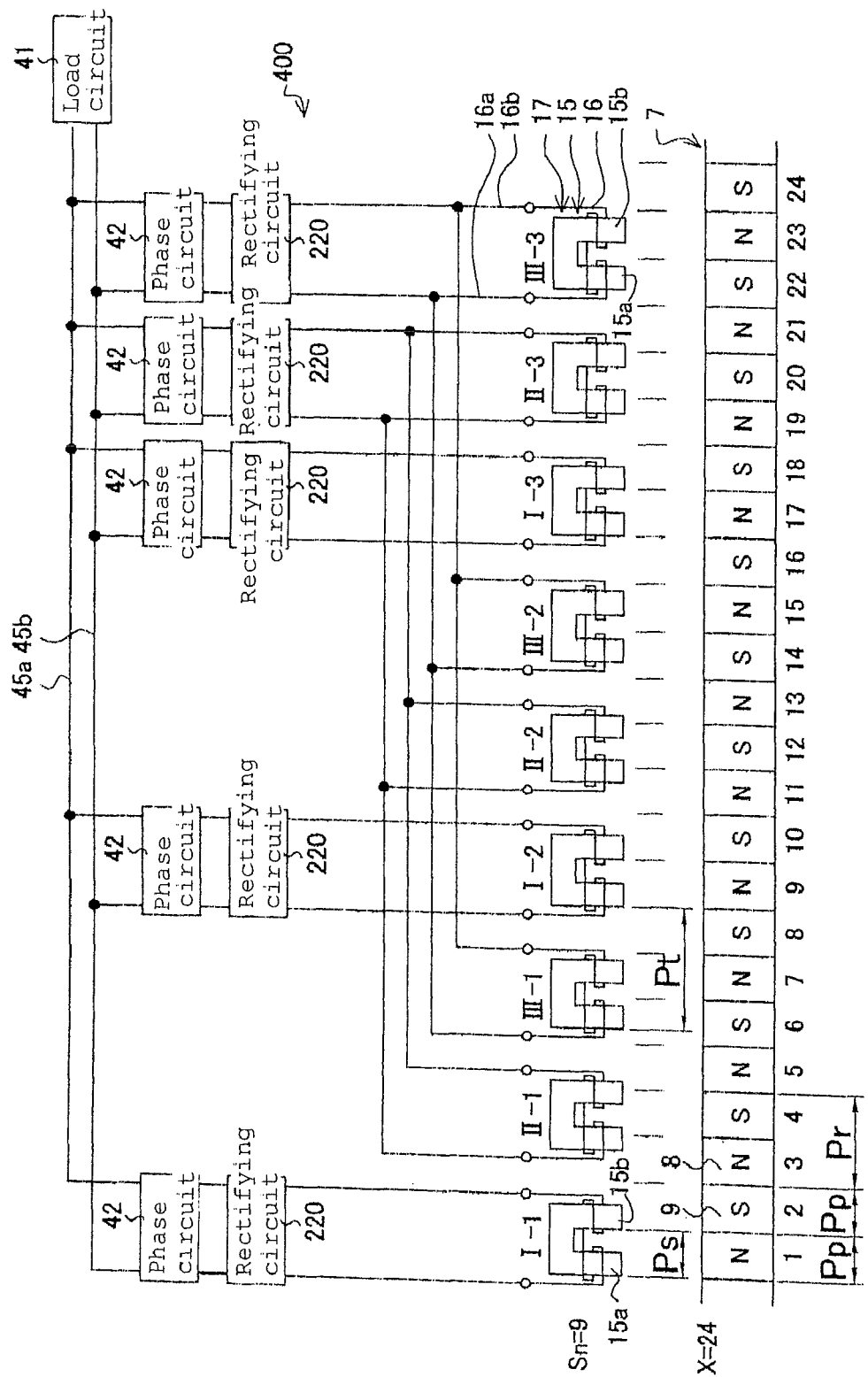
FIG. 25 is a cross sectional view showing a tenth embodiment of a power generator according to the present invention.
Figure 26:
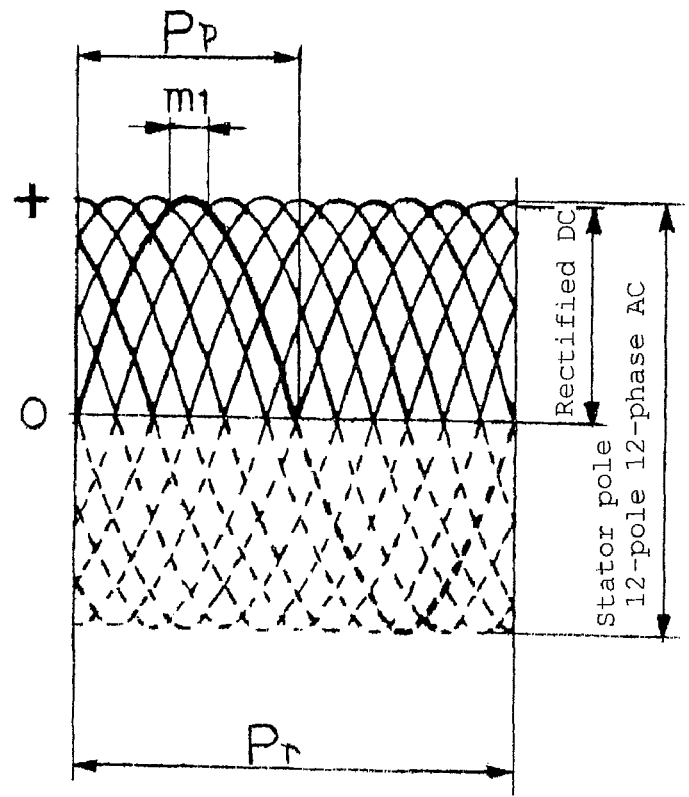
FIG. 26 is a voltage waveform figure showing rectified waveform by conventional power generator.
Figure 27:
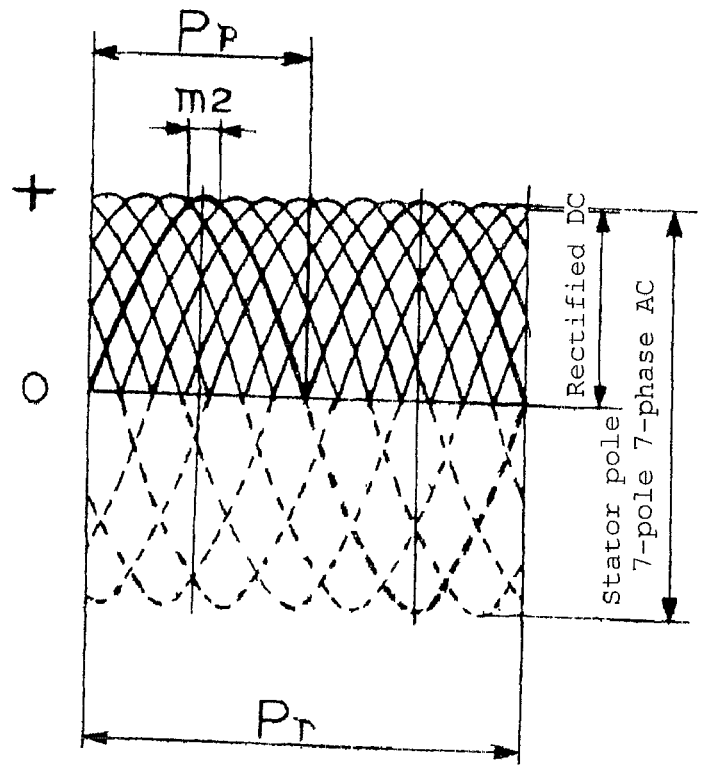
FIG. 27 is a voltage waveform figure showing rectified waveform by conventional power generator.
Figure 28:
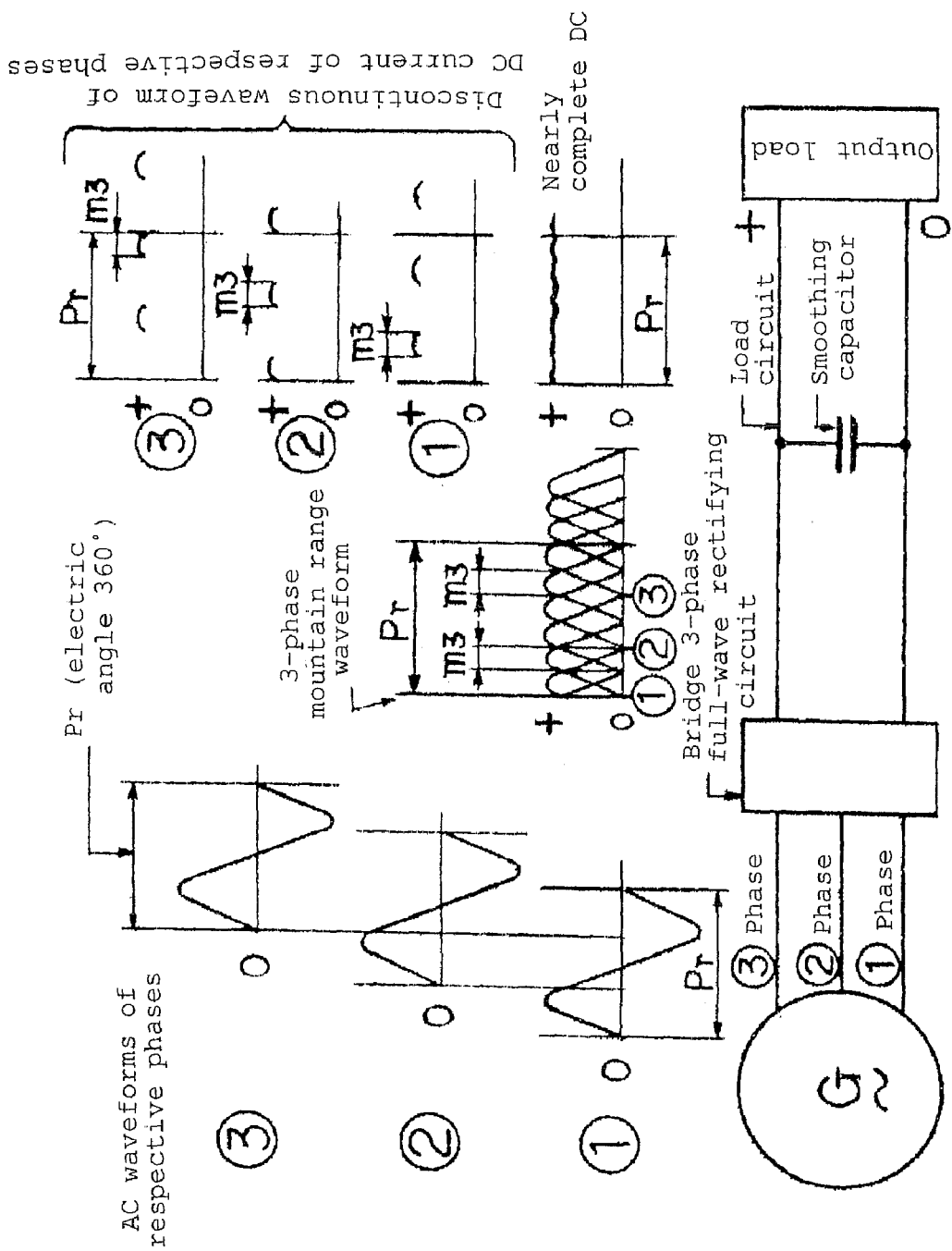
FIG. 28 is an explanatory figure showing the conventional circuit structure and waveforms of respective portions.

(8) As for full-wave rectifying circuit 18 and phase circuit 42, for example as shown in FIG. 25, like the power generator 400 of the tenth embodiment to have 9 pole stator coils to create 3-phase AC power, in only stator group I belonging to same phase, one circuit per stator coil included therein, three circuits in total may be assembled in, and per stator groups II, III belonging to same phase, one circuit, two circuit in total may be assembled in, and five circuits in total may be arranged or the like, and thereby one circuit may be assembled and stractured in per stator coil included in an optional stator coil group. In these cases too, the same operation and effects as those of the power generators according to the first through ninth embodiments can be obtained.

(9) As for exciting magnetic circuit of magnetic pole rotor, not only excited type but also exciting type may be employed.

(10) As for magnetic insulation means of stator pole, a structure where between stator iron core and frame, a magnetically insulating seat is arranged may be employed too.

(11) Between electric power output portion and load circuit (output electricity load), a servo amplifier or the like may be arranged.

(12) In the present invention, in the rectifier 40, thyrister type function also as a stop valve, or sync frequency type inverter having alternative inductance (voltage inverter) at output side or the like may be used in the place of diode. Or, sync frequency type inverter of voltage type or the like may be arranged at (+) collective circuit per system and output side (+) line end of each rectifier. In the two sync frequency type inverters, AC power occurring in each stator pole, or each phase is converted into DC power, and then the DC power may be converted into specified sync frequency AC power by sending a specified sync pulse signal from a single pulse flow signal (current) generator to all sync frequency type inverters. In each electric power output portion, it is possible to take out AC current of roughly several times of the number of phases of maximum generation current amount per one phase per system, on the basis of nearly 100%, or 100% DC current taken out at output load current 100% in output rated voltage, and the more phases up to set limit of stator poles, it is possible to perform power generation of higher efficacy and higher output.

(13) Rectifying circuit and phase circuit are not limited to the power generator or the like according to the first embodiment, but they may be arranged in portions corresponding to stator coil, or stator coil group, with regard to other power generators such as sync power generator and induction power generator and the like. In this case too, in the same manner as the effects according to the present invention, at least one of DC current or AC current of roughly multiple of the number phases of maximum generation current amount per phase can be taken out.

What is claimed is:

1. A power generator comprising:
   a magnetic pole rotor in which a plurality of N magnetic poles and S magnetic poles that form magnetic poles are arranged alternately at regular intervals onto a rotor shaft that is rotatably supported;
   a plurality of stator poles that are formed by winding stator coils around stator iron cores, and arranged at specified intervals on the side opposing the magnetic poles of the magnetic pole rotor;
   rectifying circuits that are arranged to at least one side of stator coils of the respective stator coils, or, stator coils in which AC electro motive force waveforms occur at the same phase in the stator poles thereof along with the rotation of the magnetic pole rotor;
   smoothing circuits that are connected to the output sides of the respective rectifying circuits and are respectively independent; and rectifiers whose input sides are connected to line ends of positive (+) poles in the output sides of the respective smoothing circuits, wherein a plurality of phases, that is, two phases or more are made one system, and at least one of the system is arranged, and the output side (+) line ends of the rectifiers are collectively connected to a (+) combination line per the system, the stator poles are formed respectively independently to be magnetically insulated, and the magnetic pole interval between the same magnetic poles of the magnetic pole rotor is different from the stator pole interval between stator poles opposing the magnetic poles, the relation between the pitch angle θn at the attachment positions of the total setting number of stator poles Sn and the total setting number X of magnetic poles of the magnetic pole rotor is $\theta n = \{360° - (360° \div X)\} \div Sn$, and the interval angle between the stator poles is made so as to become wide at only one position.

2. A power generator according to claim 1, wherein the magnetic rotor has the N magnetic poles and S magnetic poles arranged alternately in the rotation direction of the rotor shaft, and a twin magnetic pole portion of a pair of opposing N magnetic pole and S magnetic pole in substantially the same phase in the rotor shaft direction, the stator iron core is configured into a roughly U shape cross section so as to protrude a pair of core portions, and one end of the core portion is opposed to one magnetic pole of the twin magnetic portion, and the other end of the core portion is opposed to the other magnetic pole of the twin magnetic pole portion, and a pair of core portions are arranged so as to be along the axial direction of the rotor shaft.

3. A power generator according to claim, 1, wherein the magnetic rotor has the N magnetic poles and S magnetic poles arranged alternately in the rotation direction of the rotor shaft, the stator iron core is configured into a roughly U shape cross section so as to protrude a pair of core portions, and both the ends of the core portion is opposed to magnetic poles of the magnetic pole rotor, and a pair of core portions are arranged so as to be along the rotational direction of the rotor shaft.

\* \* \* \* \*

UNITED STATES PATENT AND TRADEMARK OFFICE
CERTIFICATE OF CORRECTION

| | | |
|---|---|---|
| PATENT NO. | : 7,768,240 B2 | Page 1 of 1 |
| APPLICATION NO. | : 11/720890 | |
| DATED | : August 3, 2010 | |
| INVENTOR(S) | : Toshio Takekawa | |

It is certified that error appears in the above-identified patent and that said Letters Patent is hereby corrected as shown below:

<u>Column 4</u>
  *Lines 66-67*: delete "of claim 2"

<u>Column 5</u>
  *Line 6*: delete "of claim 3"
  *Lines 19-20*: delete "of claim 4"
  *Line 29*: delete "of claim 5"
  *Line 43*: delete "of claim 5"
  *Line 57*: delete "of claim 1"
  *Line 65*: delete "of claims 2, 3,4"

<u>Column 6</u>
  *Line 16*: delete "of claim 5"

Signed and Sealed this
Fourth Day of January, 2011

David J. Kappos
*Director of the United States Patent and Trademark Office*